United States Patent [19]

Hoffman et al.

[11] 3,902,374
[45] Sept. 2, 1975

[54] ELECTROSTATIC RATE GYROSCOPE

[75] Inventors: Jay Hoffman, Livingston; William C. Albert, Boonton; John Evans, Oakland, all of N.J.

[73] Assignee: The Singer Company, Little Falls, N.J.

[22] Filed: Oct. 19, 1973

[21] Appl. No.: 408,195

[52] U.S. Cl. ............ 74/5.6 D; 74/5.7; 308/10; 73/517 AV
[51] Int. Cl.² .................................... G01C 19/28
[58] Field of Search ............ 74/5.41, 5.6 R, 5.6 D, 74/5.7, 5.4, 5.46; 308/10; 73/517, 505

[56] References Cited
UNITED STATES PATENTS

| | | | |
|---|---|---|---|
| 3,252,340 | 5/1966 | Watt | 74/5.7 X |
| 3,260,475 | 7/1966 | Ormsby | 74/5 X |
| 3,262,324 | 7/1966 | Taylor | 74/5 |
| 3,413,859 | 12/1968 | Riordan | 74/5.6 D |
| 3,611,815 | 10/1971 | Fischell | 308/10 X |
| 3,722,295 | 3/1973 | Passarelli, Jr. | 74/5.7 |

*Primary Examiner*—Charles J. Myhre
*Assistant Examiner*—William C. Anderson
*Attorney, Agent, or Firm*—T. W. Kennedy

[57] ABSTRACT

A two-axis rate gyroscope of the captured type is provided having a "Saturn-shaped" rotor disposed within a sealed housing. The interior of the housing is evacuated to a "hard" vacuum and an electrostatic suspension system is provided for the rotor, so that the rotor has a virtually frictionless spin bearing. An electrostatic capture system is provided to null rotor rotation with respect to the housing about the two precession axes of the gyroscope. The capture electrodes of this system are mounted on a cup-shaped support member which is mounted for limited rotational movement about two perpendicular axes which are parallel to the gyroscope precession axes and vibrating beam force transducers are connected between the support member and the housing to sense the reaction torque exerted by the capture system during capture, so that the output signals from the transducers provide two-axis rate information. The capture system also includes an axis coupling circuit which is responsive to rotor spin speed and which causes the capture system to act as a direct-coupled positional servomechanism at low rotor speeds to erect the rotor during gyroscope start-up. When the rotor reaches full speed, the capture system acts as a quadrature coupled servomechanism to null the rotor and produce a rate output.

20 Claims, 35 Drawing Figures

PATENTED SEP 2 1975　　　　　　　3,902,374

SHEET 2

PATENTED SEP 2 1975  3,902,374

SHEET 3

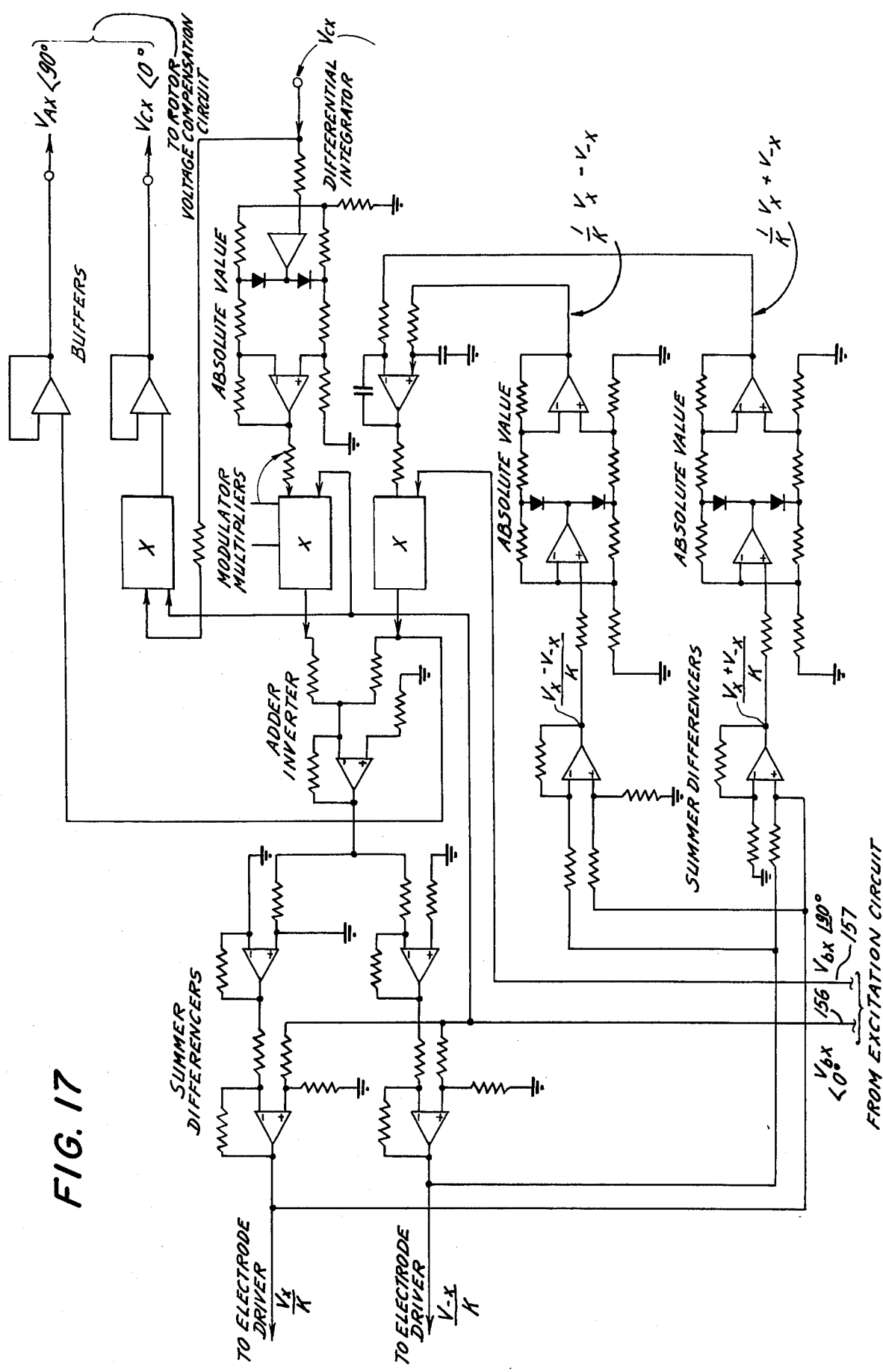

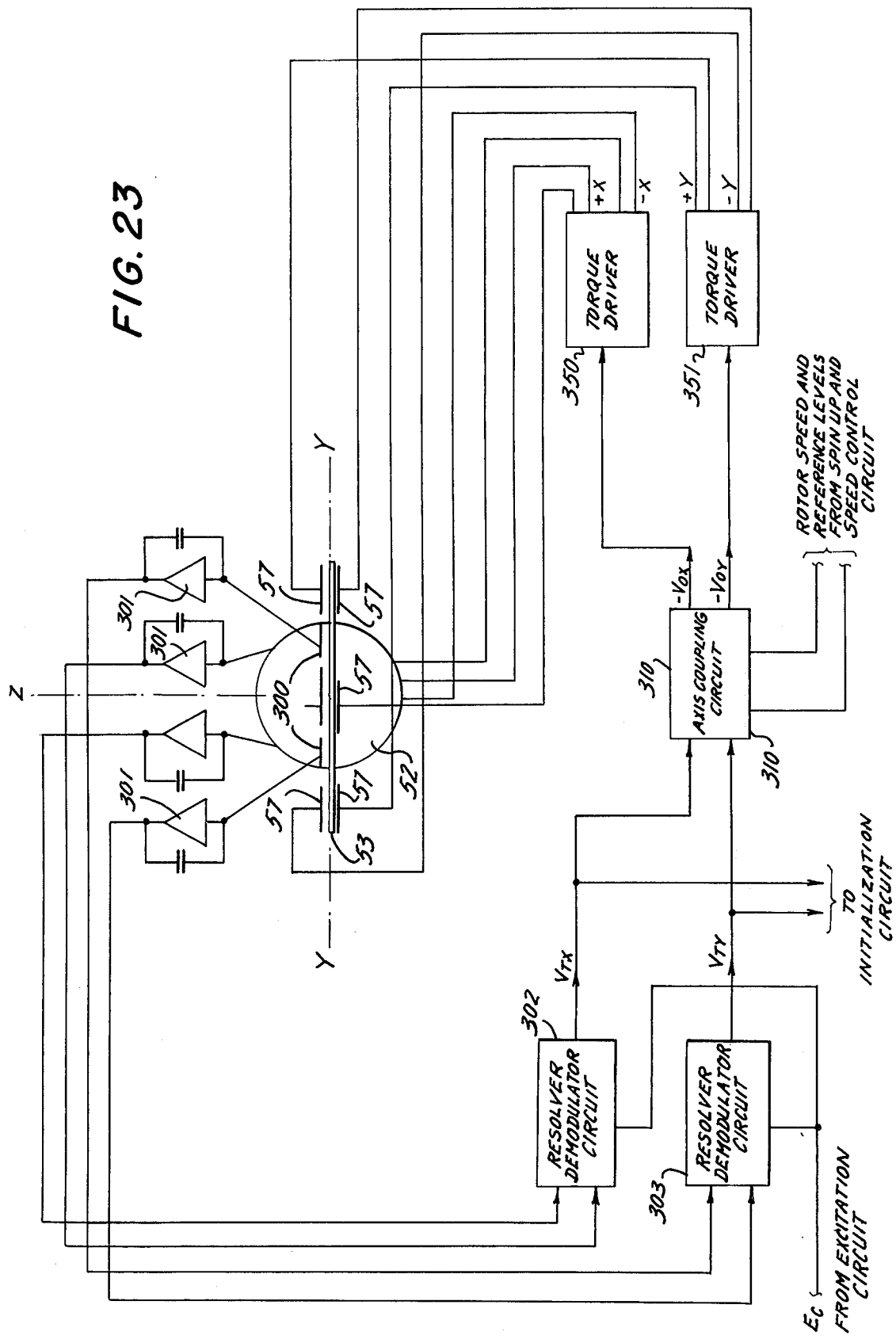

ELECTROSTATIC RATE GYROSCOPE

BACKGROUND OF THE INVENTION

1. Field of the Invention

This invention relates to inertial sensing devices and the like and more particularly to a two-axis electrostatic rate gyroscope of the captured type.

2. Description of the Prior Art

Gyroscopes are employed in inertial navigation and guidance systems to provide one or more fixed reference attitudes or positions about one or more axes, so that the attitude or rate of change of attitude of the vehicle in which the inertial system is mounted may be measured against the fixed reference attitude. In general, gyroscopes may be classified as so called "free-rotor" gyroscopes and "captured" gyroscopes. In a free-rotor gyroscope, the spinning rotor is not restrained against angular rotation about the precession axis, so that the angular deviation of the spin axis of the rotor with respect to the gyroscope housing indicates the attitude of the vehicle in which the gyroscope is mounted. The spinning rotor is usually suspended in a gimbal ring arrangement which permits rotor rotation about one or more precession axes. By suitably processing the output signals from the gyroscope, the attitude or rate of change of attitude of the vehicle may be obtained. In a captured gyroscope, the angular rotation of the spin axis of the rotor about the precession axis or axes is restrained by a torquing or capture system which "nulls" the rotor with respect to the housing and the direction and magnitude of the torque applied to null the rotor with respect to the housing are sensed to obtain the vehicle attitude or rate of change of attitude as the case may be.

At the present time, the trend in inertial navigation and guidance systems appears to be toward the captured or "strapped-down" type because of considerations such as reliability of operation, accuracy of operation, initial cost and maintenance. The free-rotor type of gyroscope requires a wide angle pickoff system which is capable of sensing the wide angular deviation of the rotor with respect to the housing. In general, such wide angle pickoff systems are complex, cumbersome and expensive. In addition, it has been found that certain error torques and restraints exist in a free-rotor gyroscope and that these error torques and restraints change in magnitude as a function of the change in angular position of the rotor with respect to the housing, thereby making compensation difficult and expensive. In a captured or strapped-down system, the angular rotor deviation with respect to the housing is severely limited, so that these problems are substantially eliminated.

In modern inertial navigation and guidance systems, the high accuracy requirements imposed upon the gyroscope require the gyroscope to have a large dynamic range. The dynamic range is generally defined as the ratio of maximum measurable rate to accuracy of that measurement. Presently known captured gyroscopes do not meet the desired high dynamic range requirements which may, for example, run as high as $10^8$. A suitable strapped-down gyroscope should also be capable of measuring vehicle dynamic rates which are as high as 200°/second or higher with a tolerance of 0.01°/hour. Additionally, a suitable rate gyroscope should have mechanically rugged, yet simple, construction which facilitates manufacture and maintenance of the gyroscope.

SUMMARY OF THE INVENTION

It is an object of this invention to provide an electrostatic rate gyroscope of the captured type which provides the high dynamic range requirements and operating accuracy necessary for present day inertial navigation and guidance systems.

It is a further object of this invention to provide an electrostatic rate gyroscope of the captured type which is mechanically rugged in construction and which is easily manufactured and maintained.

It is still further object of this invention to provide a rate gyroscope of the captured type which utilizes a novel electrostatic suspension system for the rotor to thereby provide a virtually frictionless bearing for the spinning rotor member.

It is another object of this invention to provide a rate gyroscope of the captured type in which a novel electrostatic capture system is employed to center and align the rotor with respect to the gyroscope housing.

It is an additional object of this invention to provide an electrostatic rate gyroscope of the captured type in which vibrating beam force transducers are employed to sense the capture torques exerted by the electrostatic capture system.

It is still another object of this invention to provide a rate gyroscope of the captured type in which the rotor is electrostatically suspended and a rotor speed monitoring system is employed to correct variations in rotor speed.

It is an additional object of this invention to provide a two-axis rate gyroscope having an electrostatic capture system which not only functions to capture the rotor but also to erect the rotor at low rotor speeds during gyroscope start-up.

Briefly, the gyroscope of the present invention comprises a housing having a cavity therein, a rotor disposed within the cavity, and electrostatic suspension means for suspending the rotor within the cavity to permit rotor rotation about a spin axis and at least one precession axis. Electrostatic capture means are provided for exerting a torque on the rotor to prevent rotor rotation about the precession axis in response to an input rate applied to the input axis of the gyroscope. Force transducer means of the vibrating beam type are provided for producing an output signal in response to the torque exerted by the capture means, so that the output signal is responsive to the applied input rate to the gyroscope.

The electrostatic suspension means comprises displacement sensing electrode means for sensing the position of the rotor within the cavity and suspension electrode means which are responsive to the output of the displacement sensing electrode means for exerting an electrostatic force on the rotor. When the rotor and cavity are substantially spherical in shape, the suspension electrode means may comprise three pairs of suspension electrodes mounted on the housing surface defining the cavity. The three pairs of suspension electrodes are then disposed on three orthogonal axes with the electrodes of each pair on diametrically opposite sides of the rotor. The displacement sensing electrode means may comprise four pairs of displacement sensing electrodes which are mounted on the housing surface defining the cavity with each of the sensing electrodes being disposed in a different one of the octants defined by the suspension electrode axes. Resolver circuit means are employed to resolve the outputs of the displacement sensing electrodes into components along the suspension electrode axes. The disclosed electrostatic suspension means also includes means for maintaining the rotor at substantially zero potential to improve the operation of the suspension system.

The electrostatic capture means of the invention exerts an electrostatic force on an "equatorial" rotor flange and comprises capture sensing electrode means for sensing rotor rotation about the precision axis. A captured support member is mounted on the housing for limited movement about an axis parallel to the gyroscope input axis and is provided with a rim portion adjacent the rotor flange. Capture electrode means which are responsive to the output of the capture sensing electrode means are mounted on the capture support member rim portion, so that they exert a torque on the rotor about the gyroscope input axis in a direction to provent rotor rotation about the precession axis. The vibrating beam force transducer means is connected between the capture support member and the housing, so that it restrains movement of the capture support member about the movement axis of that member and is responsive to the reaction torque exerted on the capture member by the capture electrode means. The output signal of the transducer means is then a function of the input rate applied to the gyroscope.

When the gyroscope of the invention has two input axes, first capture electrode means are mounted on one precession axis and second capture electrode means are mounted on the other precession axis. The capture support member is then mounted for rotation about two perpendicular axes which are parallel to the gyroscope input axes. Axis coupling circuit means which are responsive to rotor spin speed are provided to cause said capture means to act as a direct coupled positional servomechanism at low rotor speeds to errect said rotor and quadratrure coupled servomechanism at high rotor speeds to capture said rotor.

The nature of the invention and other objects and additional advantages thereof will be more readily understood by those skilled in the art after consideration of the following detailed description taken in conjunction with the accompanying drawings.

BRIEF DESCRIPTION OF THE DRAWINGS

In the drawings:

FIG. 17 is a circuit diagram of the X axis suspension circuit shown in FIG. 14 of the drawings;

FIG. 23 is a block diagram of the electrostatic capture system of the gyroscope of the invention;

DESCRIPTION OF THE PREFERRED EMBODIMENT OF THE INVENTION

Figure 1:
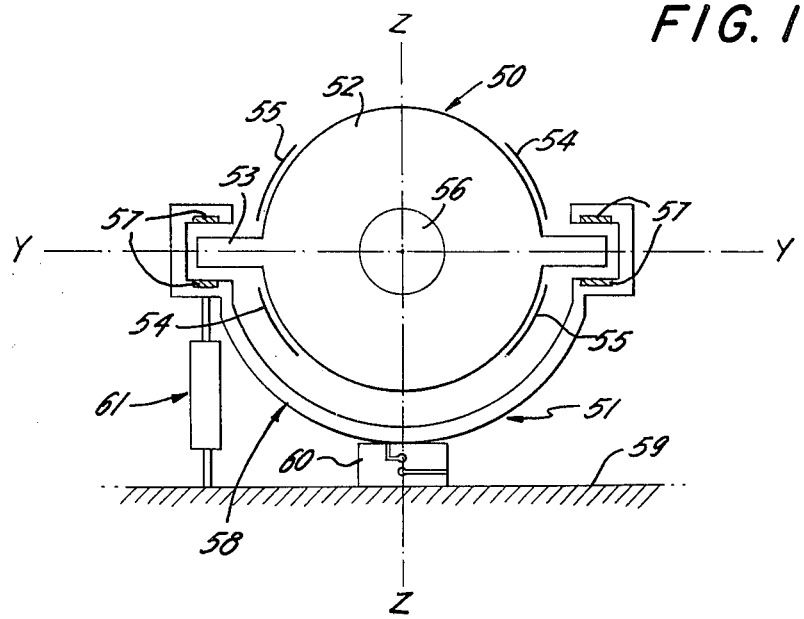
FIG. 1 is a schematic diagram of a two-axis, electrostatic rate gyroscope constructed in accordance with the teachings of the present invention.

Referring now to FIG. 1 of the drawings, there is shown a schematic diagram of a two-axis rate gyroscope constructed in accordance with the teachings of the present invention. The gyroscope comprises a rotor 50 and a capture system indicated generally as 51. The rotor 50 consists of a spherical portion 52 upon which is mounted or formed an equatorial flange 53 which gives the rotor a "Saturn-shaped" appearance. The rotor is arranged to rotate about a spin axis Z shown in the drawing, so that the equatorial flange 53 is substantially disposed in the X-Y plane which is perpendicular to the spin axis. This Saturn-shaped rotor is suspended in a cavity in the gyroscope housing by means of three pairs of electrostatic suspension electrodes 54, 55 and 56 which are disposed on three orthogonal axes. The electrostatic suspension system functions to restrain the rotor from translatory movement along the X, Y and Z axes, but permits the rotor to rotate about these three axes. The rotor is permitted to rotate freely about the spin axis Z but is restrained from rotation about both the X and Y axes by means of the electrostatic capture system 51. The capture system consists of two pairs of capture electrodes 57 which are disposed on the Y axis of the gyroscope and two pairs of capture electrodes (not shown) which are disposed on the X axis of the gyroscope. The electrodes of each pair are disposed on opposite sides of the rotor flange 53. The capture electrodes 57 are mounted on a capture system support member 58 which is mounted on the gyroscope housing 59 by means of a special hinge assembly 60. The hinge assembly 60, which will be described in detail hereinafter, functions to restrain the capture support member 58 from translatory movement along all three gyroscope axes but permits rotational movement of the capture member about two perpendicular axes which are parallel to the X and Y axes. A vibrating beam force transducer 61 is connected between the gyroscope housing 59 and the capture support member 58 on the Y axis of the gyroscope to sense the reaction torque on the capture member 58 by the capture system when the rotor is restrained from rotation about the X axis. A similar vibrating beam force transducer (not shown) is provided on the X axis of the gyroscope to sense the reaction torque exerted on the capture support member for torques exerted by the capture system about the Y axis. As will be explained hereinafter, the two vibrating beam force transducers prevent rotation of the capture support member 58 about the two axes of rotation permitted by the hinge assembly 60.

When the rotor 50 is disposed within an air-tight housing and the interior of the housing is evacuated to a "hard" vacuum, the electrostatic suspension system provides a virtually frictionless bearing for the rotor member. The extremely low power dissipation in the spin bearings for the rotor eliminates the need for continuous rotor speed torquing. The rotor speed decays so slowly that relatively long periods of time elapse before significant change in speed occurs. Accordingly, the rotor torques needed for rotation of the rotor need not be applied continuously but may be applied only at such times when the rotor speed sensing system measures a decay in rotor speed greater than a preselected value. In a rate gyroscope, the rotor speed may be allowed to decrease slowly while being continuously monitored and updated. The use of an electrostatic suspension system for the rotor provides another important benefit in that the suspension forces which are exerted on the rotor by suspension system do not produce gyroscope errors. This benefit is obtained because electrostatic forces exerted on the rotor by the suspension electrodes 54, 55 and 56 act along a line which is perpendicular to the conducting surfaces. Accordingly, there is no tangential force component which may act to produce a spurious angular rotation of the rotor about the X and Y output axes. When the rotor is truly spherical in shape, the electrostatic force passes through the center of gravity of the rotor and cannot exert any torque about the three axes of rotation of the rotor.

In operation, when an input rate is applied to the gyroscope because of an angular movement of the vehicle in which the gyroscope is mounted, the rotor precesses about one or both of the X-Y precession axes and the rotor tends to be forced out of its null position with respect to the gyroscope housing. An error voltage is developed in the capture system and is amplified and applied to the capture electrodes. Since the four pairs of electrodes 57 are disposed on the X and Y precession axes of the gyroscope, a torque is exerted on the rotor flange 53 by the electrodes which returns the gyrscope rotor to the null condition. By virtue of Newton's Third Law of Motion, an equal and opposite torque is exerted on the capture support member 58 by the capture electrodes. This reaction torque is sensed by the two force transducers which are located on the output axes of the gyroscope. Accordingly, the reaction torque sensed by the force transducers is proportional to the input rate being sensed by the gyroscope. The vibrating beam force transducer which will be described in detail hereinafter is capable of sensing this reaction torque with a high degree of accuracy and reliability. The use of a gyroscope of the captured type eliminates the technical difficulties inherent in a wide angle pickoff system and produces an inertial sensor of large dynamic range and high accuracy of operation.

Figure 3:
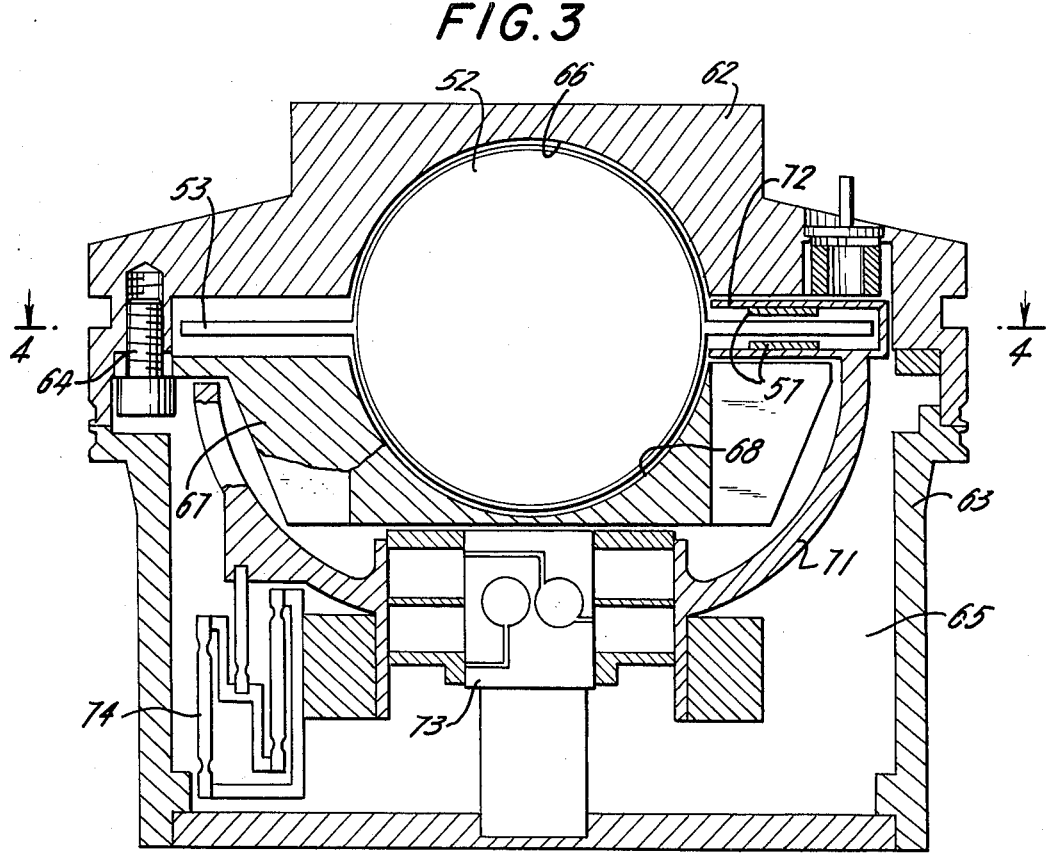
FIG. 3 is a full sectional view of the gyroscope taken along the line 3—3 of FIG. 2 of the drawings.
Figure 2:
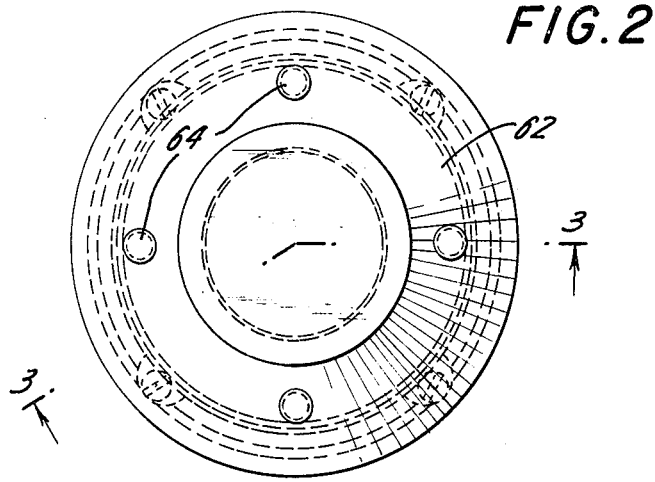
FIG. 2 is a top plan view showing the details of construction of the gyroscope of FIG. 1 of the drawings.
Figure 4:
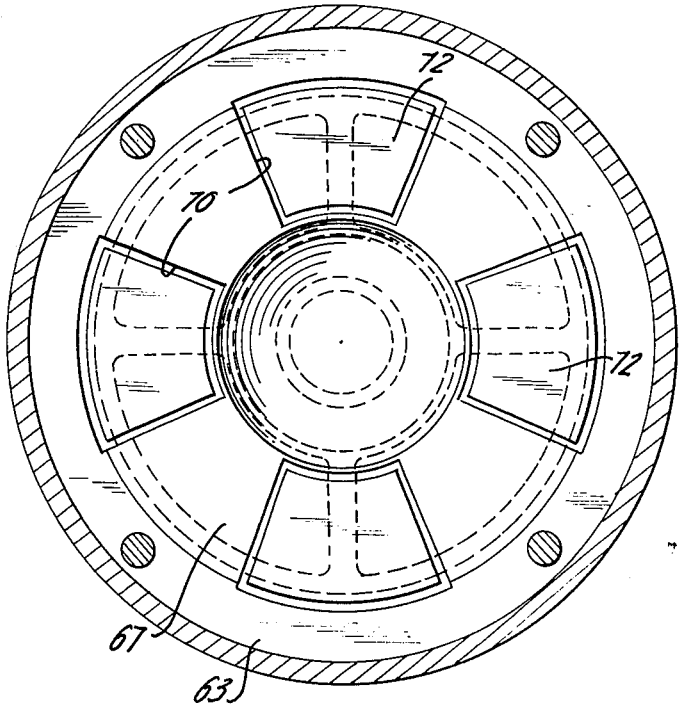
FIG. 4 is a plan view taken along the line 4—4 of FIG. 3 of the drawings with the top cover of the gyroscope removed.
Figure 5:
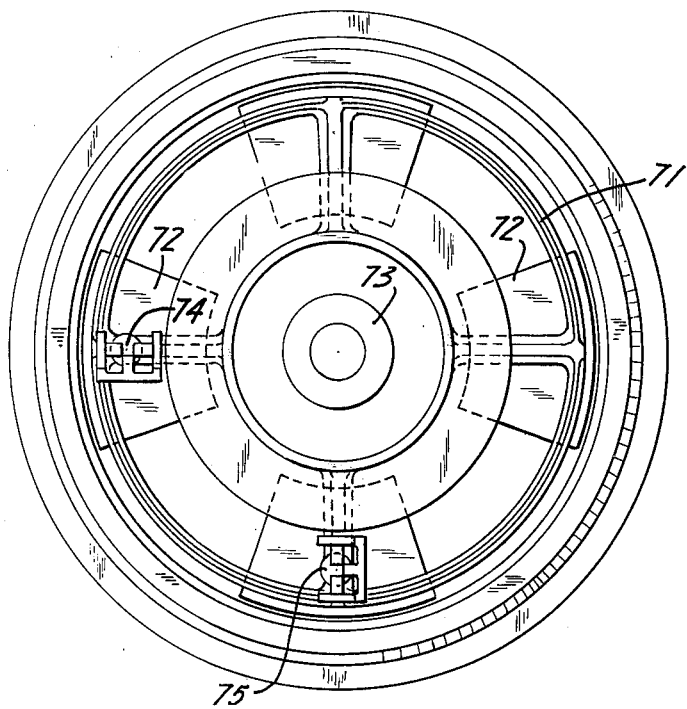
FIG. 5 is a bottom view of the gyroscope of FIGS. 1–4 of the drawings with the bottom removed to reveal details of construction.
Figure 6:
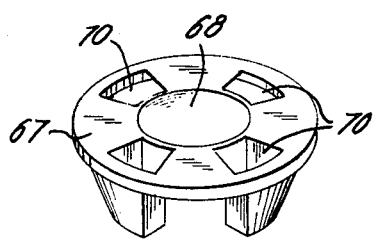
FIG. 6 is a perspective view of the gyroscope stator member with the capture system support member and housing removed.
Figure 7:
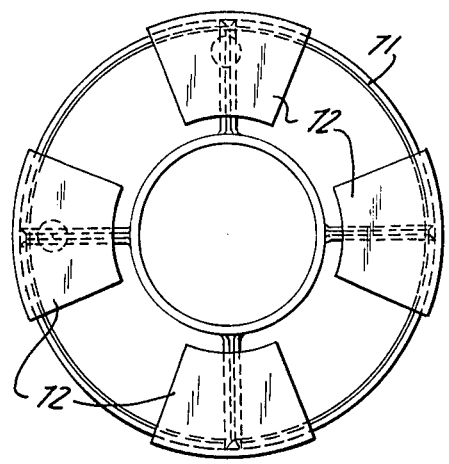
FIG. 7 is a plan view of the electrostatic capture system support member with the capture electrodes removed.
Figure 8:
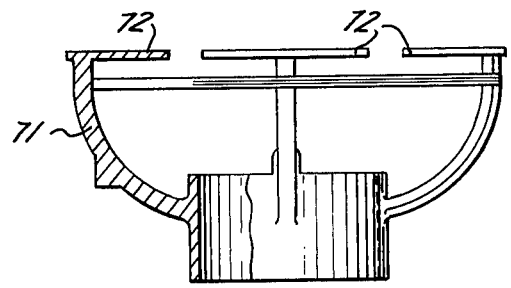
FIG. 8 is a side elevational view, partly in section, of the capture system support member of FIG. 7 of the drawings.

The detailed mechanical construction of the gyroscope of the invention is shown in FIGS. 2 through 8 of the drawings. As seen in FIGS. 2 and 3, the gyroscope housing is formed by a circular top or cover 62 which is bolted to a cylindrical bottom portion 63 by a plurality of bolts 64 to form an air-tight interior 65 which is evacuated to a "hard" vacuum. The top cover 62 is provided with a hemispherical cavity 66 which receives the spherical portion 52 of the gyroscope rotor. As seen in FIG. 3, the spherical rotor portion 52 is of thin, hollow-walled construction and may be fabricated of aluminum, for example. The equatorial rotor flange 53 is disposed in the plane defined by the X-Y precession axes of the gyroscope. The function of the equatorial flange 53 of the gyroscope rotor is to act as an inertia rim to produce the necessary rotor momentum and to provide a surface for the capture electrodes to exert their electrostatic force on. A cylindrical housing portion 67 having a hemispherical cavity 68 formed therein is bolted to the top cover 62 of the gyroscope by means of the bolts 64, so that the spherical rotor portion 52 is concentrically disposed in a substantially spherical cavity formed by the hemispherical cavity portions 66 and 68. As seen in FIG. 6, the housing portion 67 is provided with four openings 70 which are disposed on the X and Y precession axes of the gyroscope. A cup-shaped capture support member 71 shown in FIGS. 7 and 8 of the drawings is concentrically disposed around the housing portion 67. The support member 71 is provided with four, flat projecting surfaces 72 upon which are mounted the capture electrodes 57. The projections 72 extend through the openings 70 formed in the housing portion 67. The capture electrodes or pads 57 are formed of electrically conductive material on the capture support member 71 and are electrically insulated from the support member suitable insulating means (not shown). For example, the electrodes may be formed by electrodeposition on a ceramic insulating material which is bonded to the support member. As mentioned previously, four pairs of capture electrodes 57 are provided with four of the electrodes located above the rotor flange 53 and four located below the flange. These capture electrodes are so disposed that two pairs lie along the X precession axis and two pairs lie along the Y precession axis.

The capture system support member 71 is mounted on the gyroscope housing 63 by means of a flexure hinge assembly 73. The purpose of the flexure hinge assembly 73 is to prevent translatory movement of the support member 71 along the three gyroscope axes and to permit angular rotation about two perpendicular axes which are parallel to the X and Y gyroscope precession axes. This permits the rim portion of the capture support member upon which the capture electrodes are mounted to rotate with the rotor flange 53 when the capture system exerts a torque on the rotor. In this hinge arrangement, two pairs of hinges are employed on each axis. Each hinge is soft or compliant in one linear direction. When the two pairs are rotated 90° with respect to each other on each axis, the soft direction of one hinge pair is reinforced by the stiff direction of the other hinge pair and a linearly stiff suspension results which permits rotational compliancy about the two perpendicular axes of the hinge which are parallel to the precession axes of the gyroscope. For a more detailed description of a flexure hinge of this type, reference is made to U.S. Pat. No. 3,354,726, granted Nov. 28, 1967.

The capture support member 71 is prevented from rotating about its two hinge axes by the vibrating beam force tranducers which are disposed on the two precession axes of the gyroscope between the member 71 and the housing 63. The reaction torque exerted by the capture electrodes on the support member 71 about the X gyroscope axis is sensed by a vibrating beam force transducer 74 which is connected between the support member and the gyroscope housing on the Y axis. A similar force transducer 75 is connected between the support member and the gyroscope 75 is connected between the support member and the gyroscope housing on the X gyroscope axis to measure the reaction torque about the Y axis. Each force transducer produces an electrical output signal which is a function of the stress produced in the resonator beams of the transducer by the reaction torque being sensed. The construction of these vibrating beam force transducers will be described in detail hereinafter.

Figure 9:
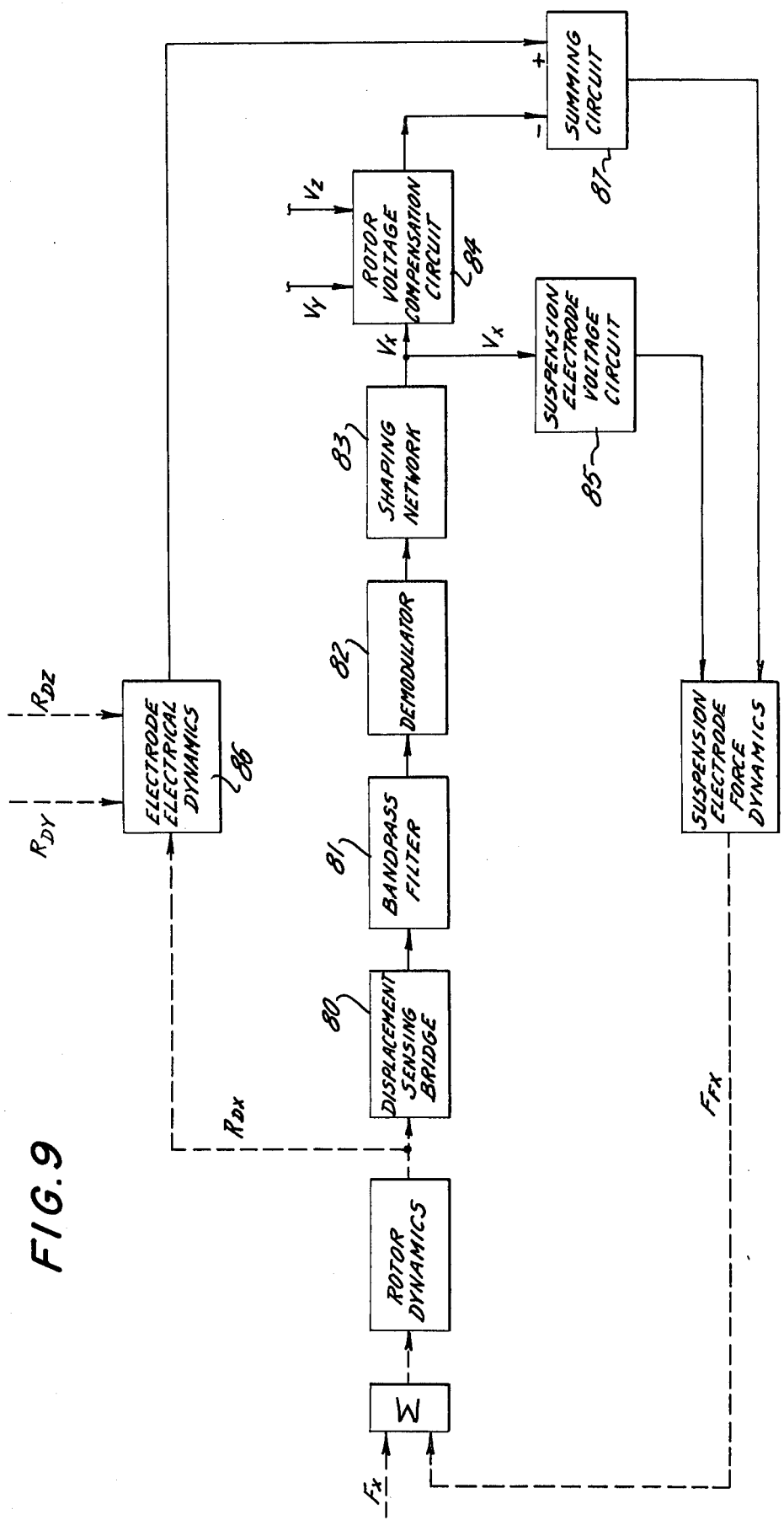
FIG. 9 is a functional diagram of the electrostatic rotor suspension system of the gyroscope for a single suspension axis.

Referring now to FIG. 9 of the drawings, the operation of the electrostatic rotor suspension system will be explained by means of a functional diagram for operation on a single axis, namely, the X axis. In the diagram of FIG. 9, a dotted line will be employed to designate a force input or output and a solid line will be employed to designate an electrical signal input or output. As illustrated, when a force F is applied to the rotor, a rotor displacement $R_O$ will occur from the normal or centered position of the rotor. The component of the force $F_X$ which is directed along the X axis will produce a rotor displacement component along the X axis of $R_{DX}$. This displacement component is converted by a displacement sensing bridge 80 in the X axis suspension system into a corresponding voltage output signal which is passed through a bandpass filter 81 to remove the unwanted portion of the sensing bridge output which results from the existance of a residual rotor voltage. This signal is then demodulated in a demodulator 82 to obtain the desired displacement information and the output signal from the demodulator is passed through a shaping network 83 to reduce excessive phase lag. The output signal $V_X$ from the shaping network 83 is applied simultaneously to a rotor voltage compensation circuit 84 and a suspension electrode voltage circuit 85. The suspension electrode voltage circuit 85 produces an electrical output signal of suitable form which is applied to the X axis suspension electrodes. These electrodes produce a force $F_{FX}$ which is directed along the X axis of the gyroscope. In a similar manner, the rotor displacement components $R_{DY}$ and $R_{DZ}$ along the Y and Z axes of the gyroscope are converted by the Y and Z axes electrostatic suspension circuits into force components lying along the Y and Z axes.

It may be noted that the gyroscope rotor should be maintained at a nearly zero potential to maintain a suitable linearity between the electrostatic force exerted by the suspension electrodes and the corresponding rotor displacement. If the rotor is not maintained at zero potential, the forces acting on the rotor cannot be adequately controlled. Accordingly, the electrostatic force output from the suspension electrodes will vary nonlinearly with respect to the rotor displacement, so that a reduced load capacity for the gyroscope will result. As seen in FIG. 9, the three components of rotor displacement, $R_{DX}$, $R_{DY}$ and $R_{DZ}$ will produce an electrical output which is shown functionally as block 86. This output represents the rotor potential induced on the rotor because of the displacements. This electrical is summed in a summing circuit 87 with the voltage output of the rotor voltage compensation circuit 84 and a rotor voltage compensation output voltage is applied to a special rotor voltage compensation electrode which will be hereinafter described. It will be noted that the rotor voltage compensation circuit 84 also receives the signal outputs $V_Y$ and $V_Z$ from the respective shaping networks of the Y and Z axes suspension systems, so that the rotor voltage compensation signal is dependent upon all three axial displacements. Accordingly, the X axis output force $F_{FX}$ produced by the X axis suspension electrodes serves both to "center" the rotor within the housing cavity and also to reduce the rotor potential to zero. The Y and Z axes suspension systems function in the same manner and will not be further described.

Figure 10:
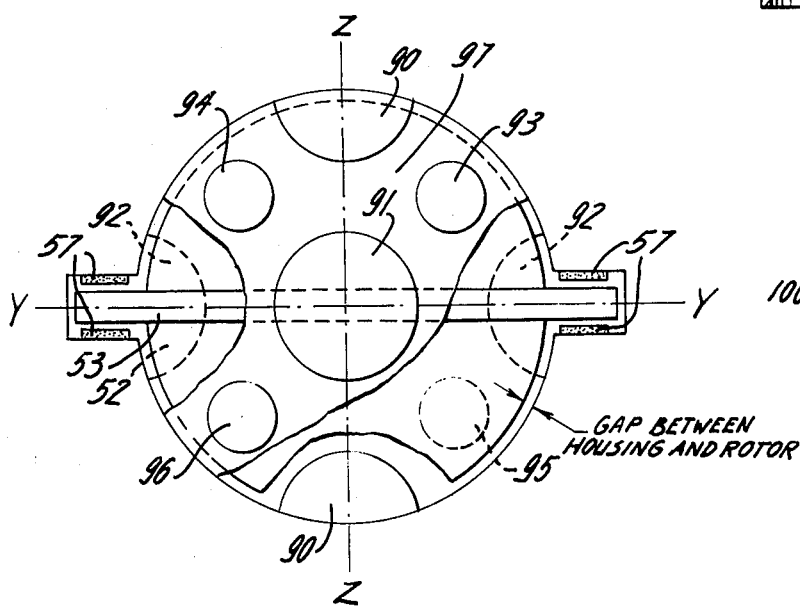
FIG. 10 is a diagram showing the location of the suspension electrodes, displacement sensing electrodes and rotor voltage compensation electrode on the walls of the rotor cavity in the housing.

The physical arrangement of the suspension system electrodes is shown in FIG. 10 of the drawings wherein it is seen that all of the electrodes are located on the inner surface of the substantially spherical cavity formed by the hemispherical cavity portion 66 of the housing cover 62 and the cavity portion 68 of the lower housing portion 67. As seen in FIG. 10, a first pair of suspension electrodes 90 are disposed on opposite sides of the cavity along the Z axis, a second pair of suspension electrodes 91 are disposed on opposite sides of the cavity along the X axis and a third pair of electrodes 92 are disposed on opposite sides of the cavity along the Y axis, so that translatory movement of the rotor along all three of the gyroscope axes may be controlled by the suspension electrode system. Since the electrostatic force exerted by each pair of suspension electrodes passes through the geometrical center of the rotor, the suspension system produces no tangential component of force which acts on the rotor to produce rotation or a spurious output. As illustrated, the suspension electrodes are all of circular shape because the area of a circular electrode is closer to its geometrical center than that of electrodes of other shapes. The use of circular electrodes also minimizes the cross-coupling effect of electrode capacitance and facilitates the manufacture of the electrodes. In practice, the electrodes may be formed on the interior of the spherical cavity of the housing by electrodeposition of conducting material on an insulating medium, such as a ceramic, for example, or by other appropriate techniques. Although the axes of the suspension electrodes are illustrated as being coincident with the spin and precession axes of the gyroscope, it will be understood that the suspension system may utilize any three orthogonal axes.

The interior of the spherical cavity also contains four pairs of displacement sensing electrodes 93, 94, 95 and 96 which serve to sence the deviation of the rotor from its centered position within the cavity. Each pair of the displacement sensing electrodes is disposed on an axis which is equidistant from the axes on which the suspension electrodes are disposed, so that each sensing electrode is disposed in a different one of the octants defined by the suspension electrode axes. By virtue of of this arrangement, the electrical outputs from the four pairs of sensing electrodes may be resolved by suitable circuit means into coordinates along the three suspension axes of the gyroscope. The portion of the surface of the cavity in the gyroscope housing which is not occupied by the suspension electrodes and the displacement sensing electrodes is used for the mounting of a rotor voltage compensation electrode 97 which is employed to maintain the rotor at substantially zero potential. High dielectric strength material, such as a ceramic, for example, may be employed to isolate the individual electrodes on the housing cavity.

Figure 11:
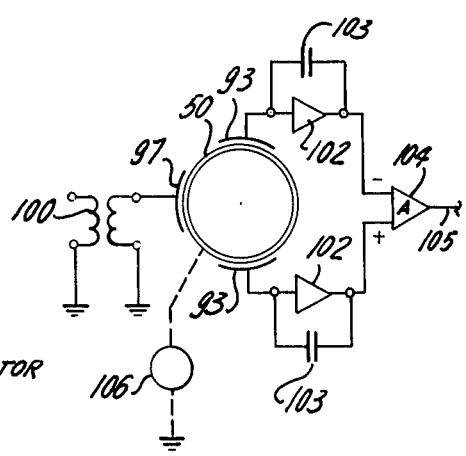
FIG. 11 is a schematic diagram of displacement sensing electrode bridge circuit suitable for use in the electrostatic suspension system.

A suitable circuit for the displacement sensing bridge 80 shown in FIG. 9 of the drawings is illustrated in FIG. 11 of the drawings. The circuit will be described with reference to a single pair 93 of the displacement sensing electrodes with the understanding that the remaining pairs of sensing electrodes may utilize the same circuit. As seen therein, the displacement sensing electrodes 93 may be excited by a transformer 100 which is coupled to the rotor voltage compensation electrode 97. Each displacement sensing electrode 93 has its output coupled to the input of a high gain amplifier 102. A fixed capacitor 103 is disposed in the feedback path of each of the amplifiers 102, so that the circuit functions in the manner of a capacitance bridge circuit with the two active branches of the bridge being formed by the displacement sensing electrodes 93. The output of each of the amplifiers 102 is coupled to a difference amplifier 104 which yields a difference output signal at 105. The output signal appearing at 105 is a direct function of the rotor displacement for the coordinates sensed the pair of sensing electrodes 93. The residual rotor potential induced on the rotor by various electrodes is shown schematically as a voltage source 106.

The bandpass filter 81 shown in FIG. 9 of the drawings functions to attenuate the unwanted portion of the output of the displacement sensing bridge 80 which is caused by the residual potential on the rotor. The residual voltage on the rotor has the same frequency as the suspension electrode input voltage which may, for example, be of the order of 12.8 KHz. The excitation voltage for the bridge circuit from source 100 may, for example, be approximately 150 KHz. The bandpass filter 81 may be designed in accordance with known techniques and may comprise, for example, a double lag network with at least an order of magnitude amplitude reduction for signals at 12.8 KHz. The shaping network 83 may comprise a simple lead-lag network and is employed to provide the necessary phase lead to stabilize the suspension system.

Figure 12:
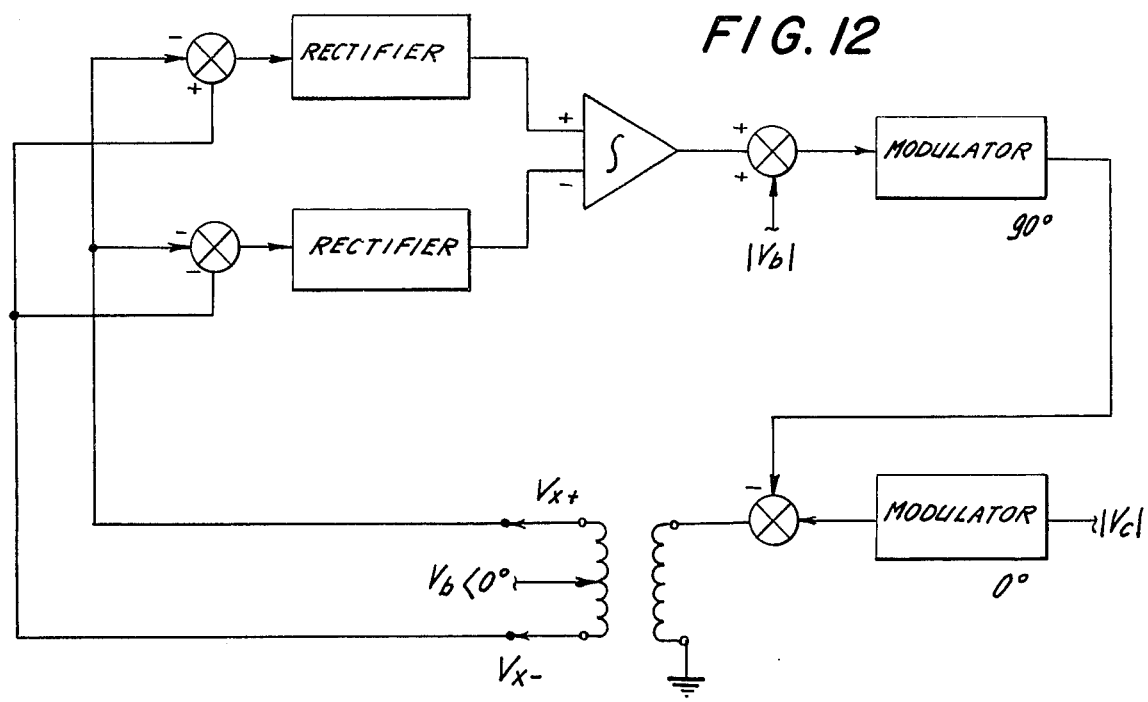
FIG. 12 is a functional diagram illustrating the generation of the X axis suspension electrode voltage.

The generation of the suspension electrode voltage for the X axis suspension electrodes is functionally shown in FIG. 12 of the drawings. The suspension electrode voltages for the Y and Z suspension axes are generated in the same manner. In order that the suspension system be stable over a wide range of inputs without resorting to the use of complicated network switching, it is necessary that the steady-state gain between electrostatic force and rotor displacement remain reasonably constant. The input voltate should therefore be a sinusoidal bias voltage of relatively large magnitude upon which is superimposed a sine wave voltage of small magnitude. The input voltage for the X axis electrodes may have the following form:

(1) $V_X = V_{bx} + V_{cx} + jV_{ax}$, and (2) $V_{X-} = V_{bx} - V_{cx} - jV_{ax}$, where $V_{bx}$ is a bias voltage of constant magnitude, $V_{cx}$ is a voltage proportional to rotor displacement, and $V_{ax}$ is a voltage having the magnitude $\sqrt{V^2 - V^2_{cx}}$. The input voltage for the Y axis suspension electrodes has the same form as the voltage for the X axis suspension electrodes but is lagging in phase by 120°. The Z axis suspension electrode voltage form is the same as the voltage form for the X axis but lags in phase by 240°.

Figure 13:
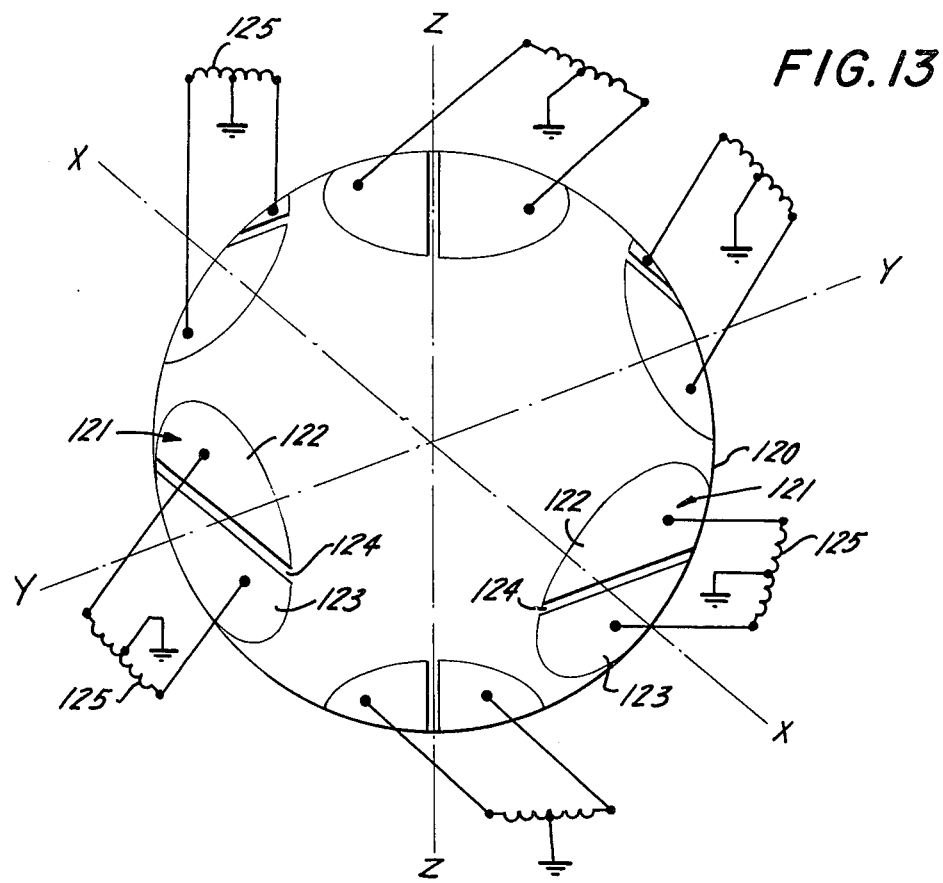
FIG. 13 is a schematic diagram showing an alternate configuration for the suspension electrodes which will eliminate the need for the rotor voltage compensation circuit shown in FIG. 9 of the drawings.

The rotor voltage compensation circuit 84, which will be described in detail hereinafter, functions to maintain the rotor at virtual zero potential under all operating conditions. As explained previously, if the rotor is not maintained at zero potential, the electrostatic force exerted by the suspension electrodes will be nonlinear with respect to rotor displacement and will limit the load capacity of the gyroscope. An alternate arrangement for maintaining the rotor at zero potential without the use of a rotor voltage compensation circuit is shown in FIG. 13 of the drawings wherein the three pairs of rotor suspension electrodes are shown mounted on the interior cavity 120 of the gyroscope housing. For convenience of illustration, only the surface defining the cavity is shown in this view. As seen in FIG. 13, each suspension electrode 121 is divided into two, semicircular electrodes 122 and 123 by an insulating strip 124, so that the total area of both electrode halves is approximately the same as the area of a single circular electrode. Each electrode half is energized from one side of a center-tapped secondary winding 125 of an output signal transformer (not shown), so that the electrode voltage applied to the primary winding of the transformer is divided into two output voltages which have the same form but which are 180° out-of-phase with respect to each other. By virtue of this arrangement, the induced rotor voltages which result from the suspension electrode input voltages will cancel out automatically for each electrode and the net residual voltage of the rotor will be due solely to any inequality in area among the suspension electrodes. The electrostatic force output will be the same as if the electrodes were not split. This arrangement also offers the additional advantage of eliminating the need for a 120° phase difference between the three suspension electrode input voltages which is required when a rotor voltage compensation circuit is employed.

Figure 14:
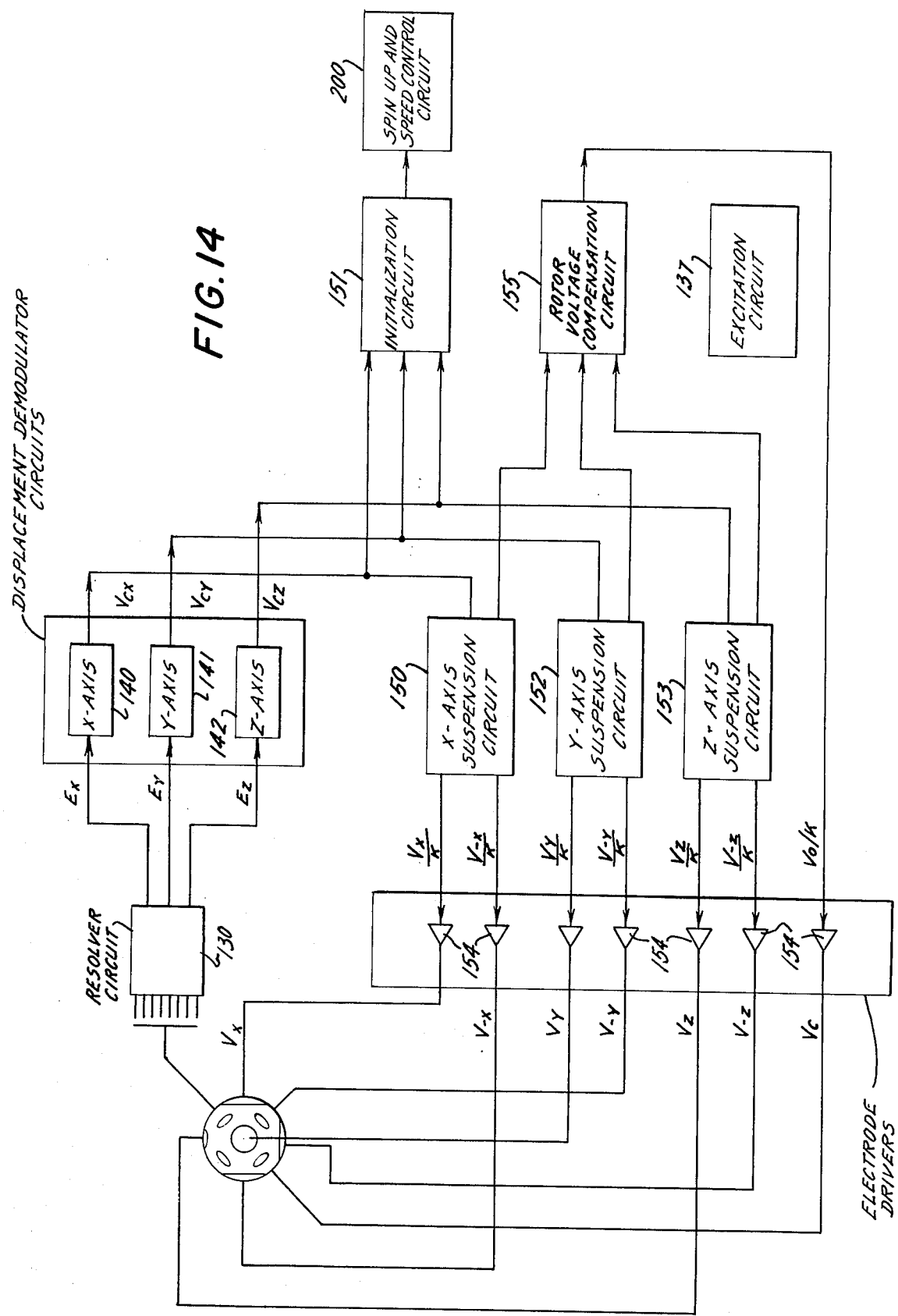
FIG. 14 is a block diagram of the electrostatic rotor suspension system for all three suspension axes.
Figure 15B:
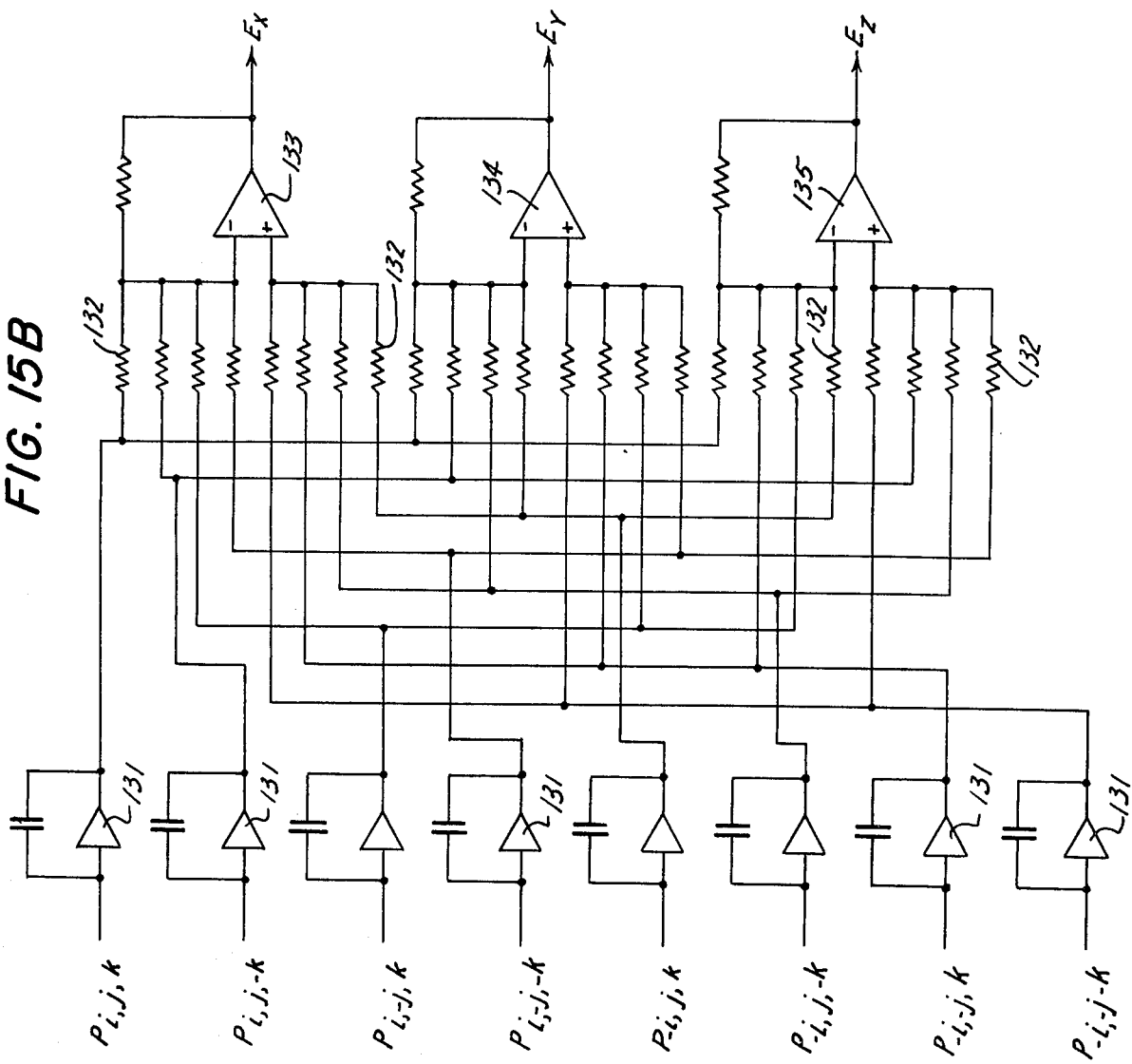
FIG. 15B is a circuit diagram of the resolver circuit shown in FIG. 14 of the drawings.
Figure 15A:
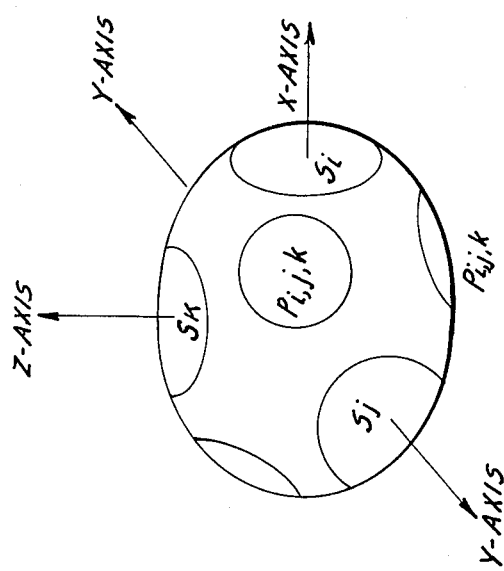
FIG. 15A is a schematic diagram showing the coordinate system for the displacement sensing electrodes.

Referring now to FIG. 14 of the drawings, there is shown a block diagram of the complete electrostatic rotor suspension system for all three axes of the gyroscope. As seen in FIG. 14, the output signals from the eight displacement sensing electrodes are applied to a resolver circuit 130 which resolves the signals from the four pairs of displacement sensing electrodes 93, 94, 95 and 96 into output signals representing the displacement along the X, Y and Z suspension axes. The displacement sensing electrodes and their associated resolver circuit 130 are shown in FIG. 15 of the drawings. In FIG. 15A it is seen that each of the eight displacement sensing electrodes may be identified by subscripts relating them to the octants in which they are located. For this purpose, the suspension electrodes which are located on the X axis of the gyroscope are identified in FIG. 15A as $S_i$ and $S_{-i}$; the suspension electrodes on the Y axis are identified as $S_j$ and $S_{-j}$; and the suspension electrodes on the Z axis are identified as $S_k$ and $S_{-k}$. Accordingly, the displacement sensing electrode which is located on the axis which is equidistant from the $S_i$, $S_j$ and $S_k$ suspension electrodes is identified by the notation $P_{i, j, k}$, while the sensing electrode which is in the octant defined by the $S_i$, $S_j$ and $S_{-k}$ suspension electrodes is identified as $P_{i,j, -k}$. As seen in FIG. 15B, each of the eight displacement sensing electrodes is connected to a separate pickoff amplifier 131, so that eight pickoff amplifiers 131 are utilized for the eight sensing electrodes. The input to a particular amplifier is identified by the aforementioned subscript system. The output of each pickoff amplifier 131 is applied through a summing resistor 132 as a sum or difference signal to each of differential amplifiers 133, 134 and 135 which correspond respectively to the X, Y and Z axes. By virtue of this arrangement, any rotor displacement from its central or suspended position is converted into output signals $E_X$, $E_Y$ and $E_Z$ which identify the displacement in terms of displacement resolved along the three suspension axes of the gyroscope.

It may be noted here that a fixed, sinusoidal excitation voltage $E_C$ is applied to the rotor voltage compensation electrode 97. By means of capacitive coupling between the compensation electrode and the rotor, the rotor is excited by this voltage. Because of the symmetrical disposition of the compensation electrode on the walls of the cavity surrounding the spherical portion of the rotor, the amplitude of the excitation level on the sphere is constant over the sphere. This excitation serves to provide the capacitive coupling for the eight displacement sensing electrodes. The excitation voltage $E_C$ is obtained from an excitation circuit 137 which will be described hereinafter.

Figure 16:
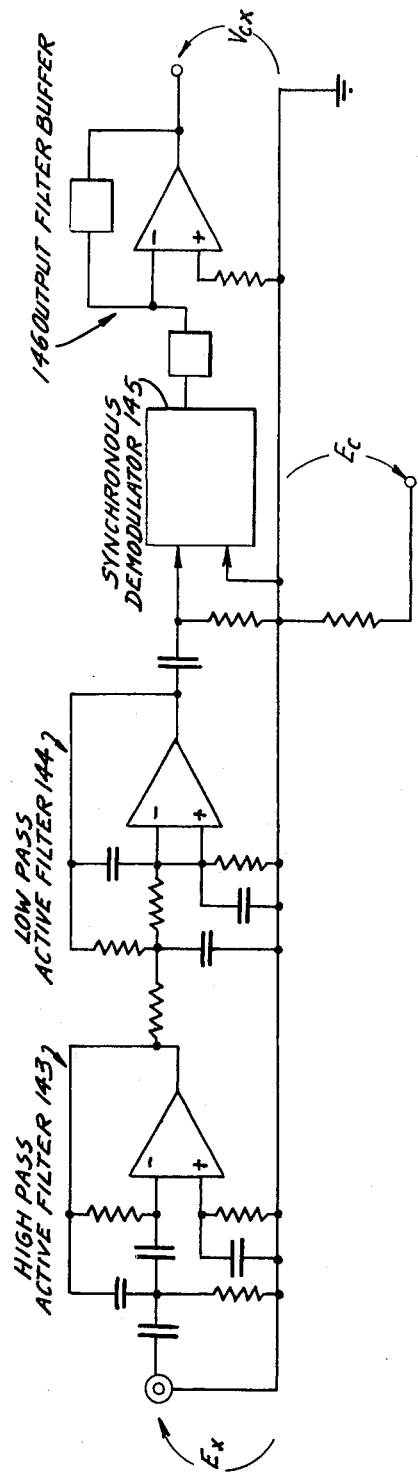
FIG. 16 is a circuit diagram of the X axis displacement demodulator circuit shown in FIG. 14 of the drawings.

Referring again to FIG. 14 of the drawings, it is seen that the resolved rotor displacement signals $E_X$, $E_Y$ and $E_Z$ are respectively applied to displacement demodulator circuits 140, 141 and 142. The three displacement demodulator circuits are identical in construction and the circuit for the X axis is shown in detail in FIG. 16 of the drawings. As seen in FIG. 16, the displacement signal $E_X$ for the X axis is passed through a high pass active filter 143 and a low pass active filter 144 to the input of a synchronous demodulator 145. The cascaded high pass and low pass active filters provide a flat-topped bandpass characteristic which is centered about the frequency of the excitation voltage $E_c$ which is applied to the rotor voltage compensation electrode. The reference voltage for the demodulator 145 is shown as the compensation electrode excitation voltage $E_C$. The demodulator 145 and an associated output filter-buffer 146 provide an output voltage $V_{CX}$ which has an amplitude proportional to the magnitude of the rotor displacement from the null position along the X axis and a polarity corresponding to the direction of the displacement.

In FIG. 14 of the drawings, it may be seen that the demodulated rotor displacement signal $V_{CX}$ is applied simultaneously to an X axis suspension circuit 150 and an initialization circuit 151, while the displacement signal $V_{CY}$ is applied simultaneously to a Y axis suspension circuit 152 and the intialization circuit 151. Finally, the $V_{CZ}$ displacement signal is applied simultaneously to a Z axis suspension circuit 153 and the initialization circuit 151. The outputs of the X axis, Y axis and Z axis suspension circuits are coupled through electrode driver circuits 154 to their respective suspension electrodes. The X axis suspension circuit 150 is shown in FIG. 17 of the drawings wherein it is seen that this circuit processes the displacement error signal $V_{CX}$ to produce signals $V_{x/K}$ and $V_{-x/K}$ which are applied to the electrode drives 154 for the X axis. This circuit also functions to produce the modulated signals $V_{CX}$ and $V_{AX}$ which are applied to a rotor voltage compensation circuit 155 shown in FIG. 14 of the drawings. The input signal $V_{CX}$ applied to the X axis suspension circuit is processed by the absolute-valuation, multiplication/modulation, integration and summation sections of the circuit as illustrated in the drawings. The computational techniques employed are well known and will not be described further herein. The output voltages $V_x$ and $V_{-x}$ have the form set forth in equations (1) and (2) herein. The modulator multipliers shown in FIG. 17 may be of the variable-transconductance type, while the operational amplifiers and computational amplifiers may be of the integrated circuit type. The bias voltages $V_{bx}$ and 0° and 90° required for the suspension circuit are respectively obtained from leads 156 and 157 which are coupled to the excitation circuit 137. Suspension circuits 152 and 153 which are for the Y axis and the Z axis respectively are the same construction as the X axis circuit and will not be described further.

Figure 18:
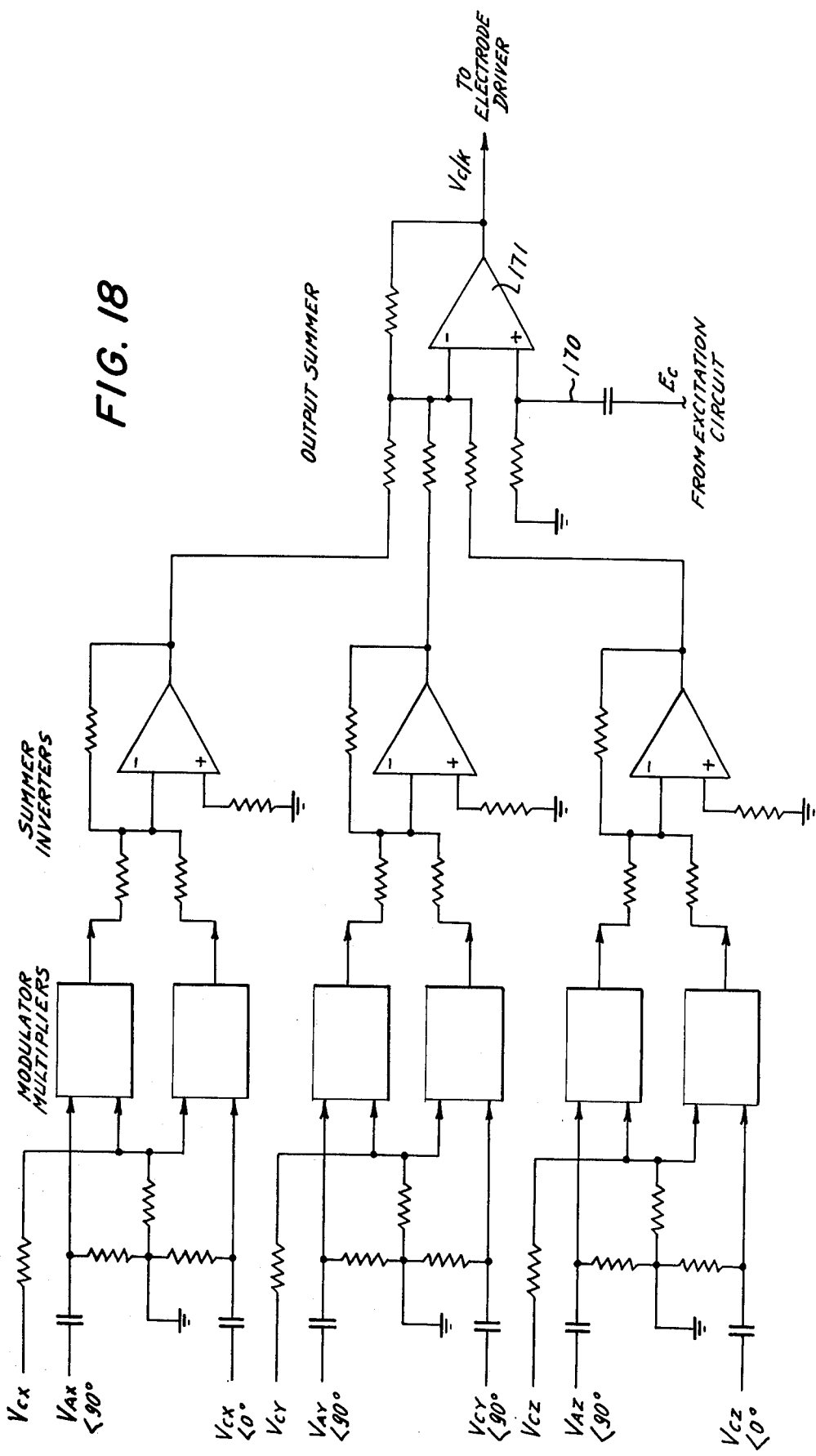
FIG. 18 is a circuit diagram of the rotor voltage compensation circuit of FIG. 14 of the drawings.

The rotor voltage circuit 155 of FIG. 14 of the drawings is shown in detail in FIG. 18. This circuit functions to produce an output voltage $V_{c/K}$ which is applied through an electrode driver 154 to the rotor voltage compensation electrode 97 on the cavity wall of the gyroscope housing. This circuit processes the $V_{CX}$ and $V_{AX}$ signals which are obtained from the X axis suspension circuit 150 as well as the corresponding signals from the Y axis suspension circuit 152 and Z axis suspension circuit 153 to obtain an output signal $V_{C/K}$ which is applied to the rotor voltage compensation electrode 97 by an electrode driver 154. The rotor compensation voltage excitation signal $E_C$, which is approximately eight times the frequency of the suspension voltage, is introduced into the output summer amplifier 171 through a lead 170 connected to the excitation circuit 137. This rotor compensation circuit is essentially a simple circuit which generates a voltage having the same magnitude as the residual rotor voltage but of opposite sign. The output voltage $V_c$ is applied to the rotor voltage compensation electrode and functions to keep the rotor at effective zero potential at all times. It may be noted from an inspection of FIG. 18 of the drawings that the components $V_{bx}$, $V_{by}$ and $V_{bz}$ of the rotor bias voltage $V_b$ are not applied to the rotor voltage compensation circuit because these components cancel each other out since they are 120° out of phase with respect to each other. The three axial components of the rotor displacement signal $V_C$ and the three axial components of the composite signal $V_A$ do not cancel out and consequently are processed in the circuit shown in FIG. 18 to obtain a voltage $V_c$ having the same magnitude as and opposite in sign to the voltage induced by these components on the rotor of the gyroscope.

Figure 19:
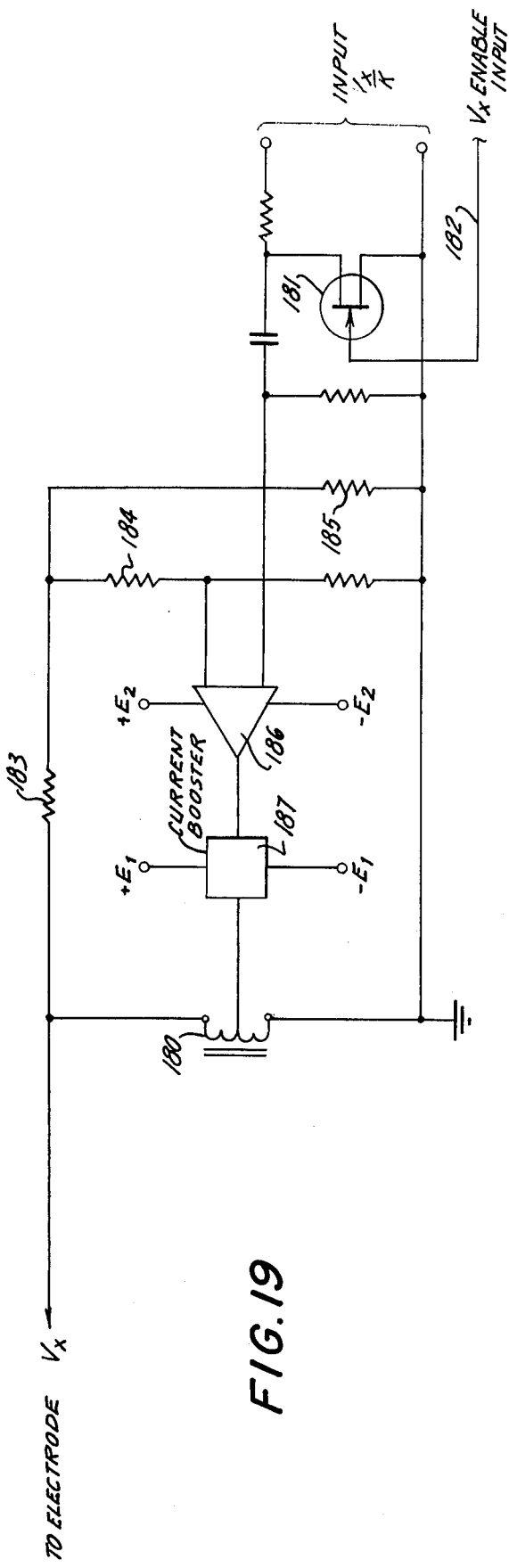
FIG. 19 is a circuit diagram of one of the X axis suspension electrode driver circuits shown in FIG. 14 of the drawings.

A circuit diagram of one of the electrode drives 154 for the X axis is shown in FIG. 19 of the drawings wherein it is seen that an autotransformer 180, which may be of the ferrite core type, for example, is employed to increase the amplitude of the voltage $V_x$ applied to one of the X axis suspension electrodes to the order of several hundred volts which is required for the generation of an adequate electrostatic suspension force. The input signal for the electrode driver is $V_{x/K}$ and is obtained from the output of the X axis suspension circuit 150. This signal is increased in amplitude in the electrode driver by a gain of K so that the output signal applied to the electrode is $V_X$. A junction field effect transistor 181 of the N-channel type has its source and drain terminals connected across the input to the driver circuit and its gate terminal connected by means of a lead 182 to receive a $V_X$ enable input signal for reasons which will be explained hereinafter. By virture of this arrangement, the application of the $V_X$ suspension voltage signal to the X axis suspension electrode associated with the electrode driver is controlled by the presence or absence of the $V_X$ enable signal. When the $V_X$ enable signal is missing, the electrode driver is disabled. Resistors 183, 184 and 185 form a feedback "T" network. Amplifier 186 is of the wide band type and its output is applied to a current booster 187 of any suitable type, so that sufficient power is applied to the electrode.

Figure 20:
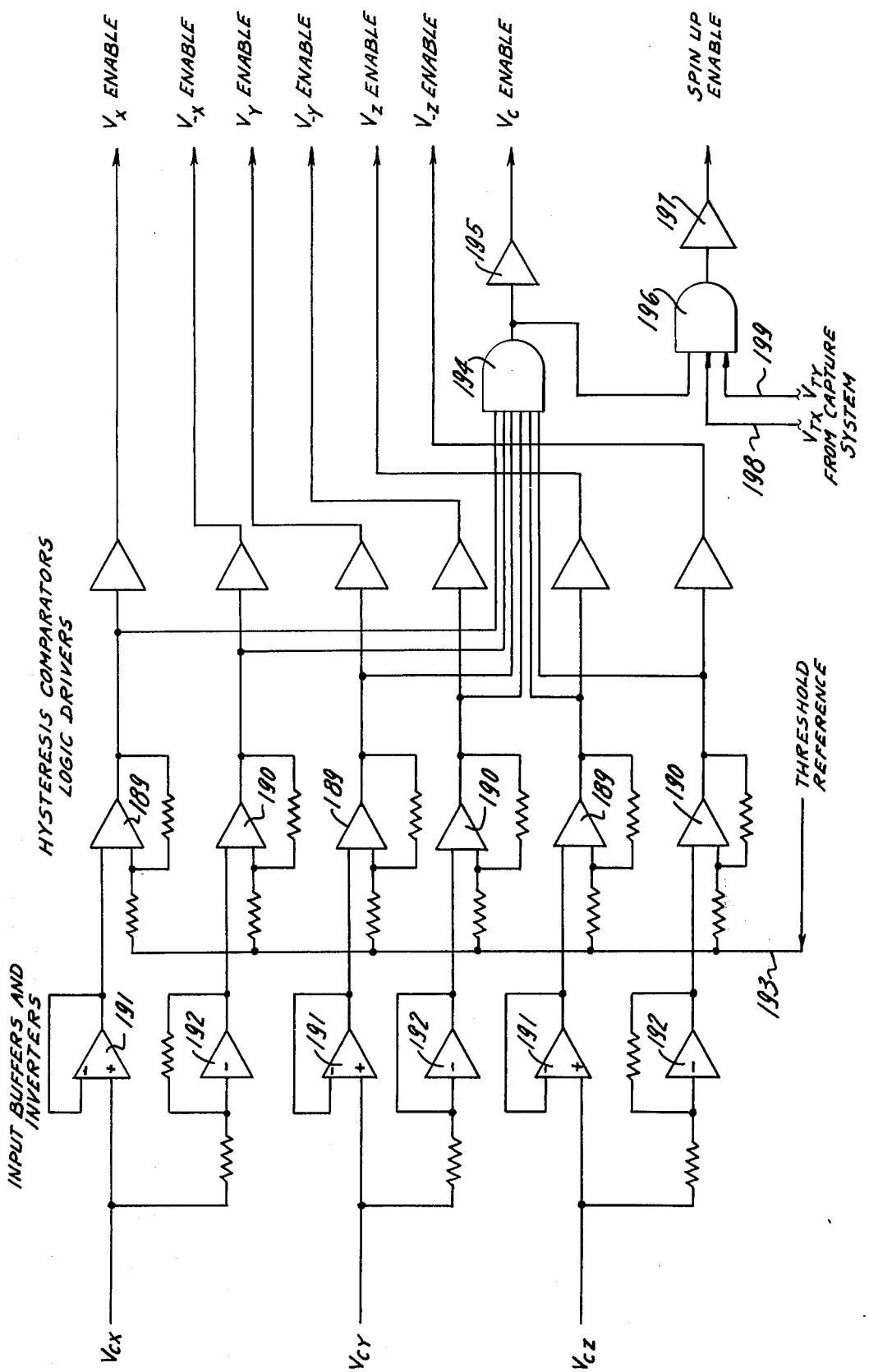
FIG. 20 is a circuit diagram of the initialization circuit of FIG. 14 of the drawings.

The suspension initialization circuit 151 of FIG. 14 of the drawings is shown in detail in FIG. 20. When the gyroscope is turned on initially, levitation of the rotor must be achieved before the spin-up torques are applied to the rotor. The initialization circuit performs this function by comparing the three components $V_{CX}$, $V_{CY}$ and $V_{CZ}$ of the rotor displacement signal to a threshold reference signal in a plurality of voltage comparator circuits 189, 190 which may be of the hysteresis type, for example. The positive-going signals representing each rotor displacement component are applied through an input buffer 191 to one input of the voltage comparator 189 associated with that signal. The same input signal is applied to an inverter circuit 192 to provide a negative-going signal which is then applied to one input of the voltage comparator 190 associated with that signal, so that positive-going and negative-going displacement signals are provided for each of the three suspension axes. Each of the voltage comparator circuits 189, 190 has the other of its inputs connected by a lead 193 to a threshold reference voltage source (not shown), so that an output is not produced from a particular voltage comparator circuit unless the rotor displacement signal applied to that comparator exceeds the level of the threshold voltage. The magnitude of the threshold voltage is so set that no output from the comparator circuits is produced unless the rotor displacement is within the physical limits of capture. If the rotor displacement for a particular suspension axis is such that the rotor cannot be captured by operation of the suspension electrodes, no "enable" signal is generated for that axis, so that the electrode driver circuit 154 associated with that axis is prevented from operating. The circuit of FIG. 20 produces a $V_x$ enable signal and a $V_{-x}$ enable signal for the X axis electrode drivers and similar pairs of signals for the Y axis and Z axis electrode drivers. Accordingly, unless the rotor is so positioned that it may be suspended by the electrostatic suspension system, the electrode drivers 154 will be disabled by the absence of the particular enable signals for the suspension axes involved.

From an inspection of FIG. 20 of the drawings, it will be seen that each of the six enable output signals from the comparator circuits 189, 190 is applied to a gate circuit 194 of the AND type which produces a rotor voltage compensation electrode enable signal $V_C$ enable through an output buffer 195. This enable signal is applied to the electrode driver circuit 154 which is energized by the output of the rotor voltage compensation circuit 155. The $V_C$ enable signal is only produced when all of the X, Y and Z axes enable signals are applied to the gate 194. The output of gate 194 is also coupled to one input of a gate 196 which generates a spin-up enable output signal through a buffer 197. The gate 196, which may be of the AND type, also receives logic signal inputs $V_{TX}$ and $V_{TY}$ from leads 198 and 199 respectively. so that the spin-up enable signal is produced only when all three logic input signals are present. The logic signals $V_{TX}$ and $V_{TY}$ are generated in the electrostatic capture system of the gyroscope and indicate that the rotor is erected, so that the equatorial flange 53 of the rotor is substantially parallel to the plane defined by the precession axes. The spin-up enable signal which is generated by gate 196 is applied to a spin-up and speed control circuit 200 shown in FIG. 14 of the drawings which controls and generates the signals required for torquing of the rotor to the desired spin speed. By virtue of this arrangement, the spin-up circuit 200 will be inoperable to generate a rotor spin torque if the spin-up enable signal is not present. This insures that the rotor displacement must be within the limits of capture by the suspension system and that the rotor is erected before any spin-up torque is applied.

Figure 21:
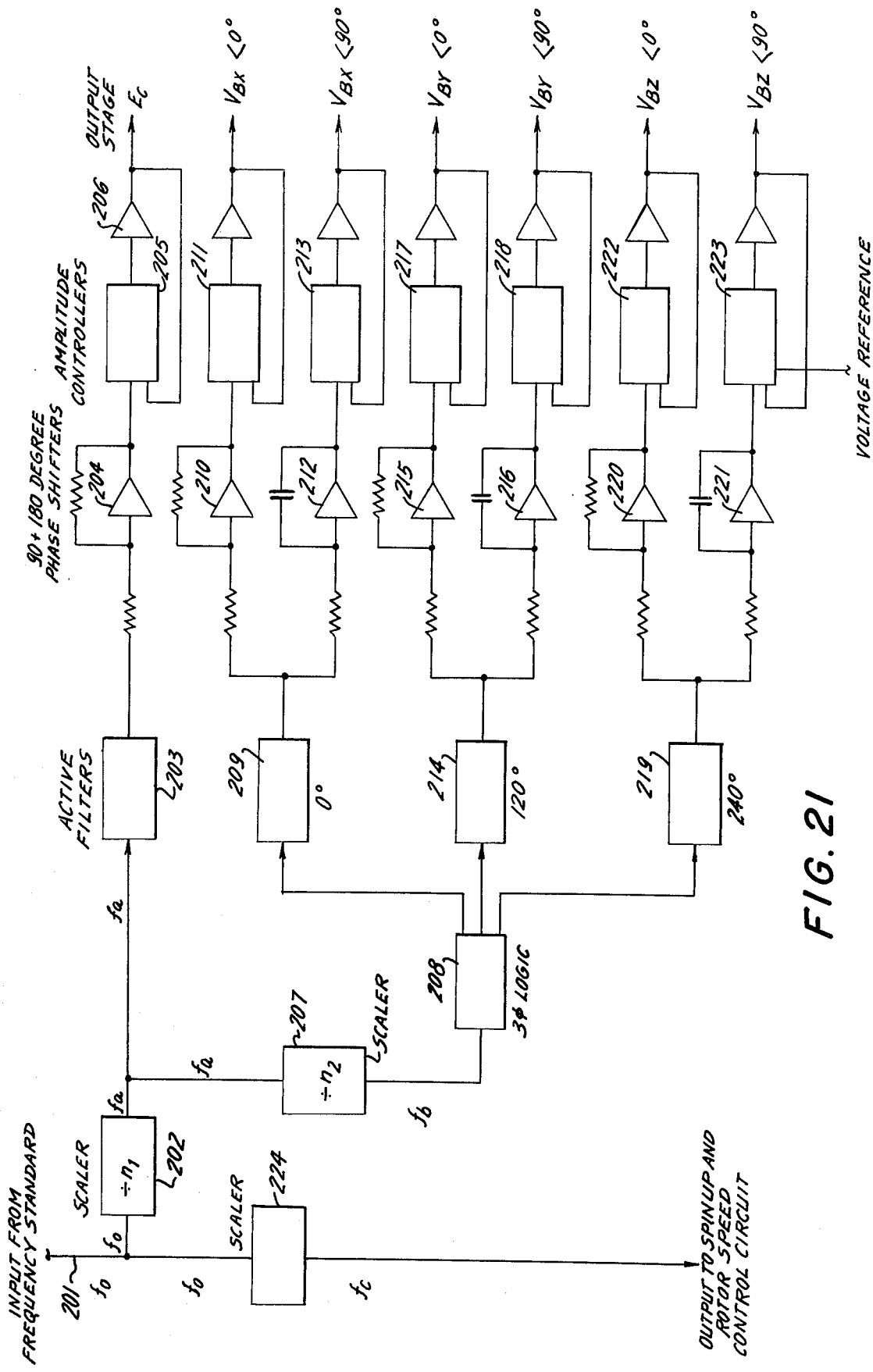
FIG. 21 is a block diagram of the excitation circuit of FIG. 14 of the drawings.

The excitation circuit 137 of FIG. 14 of the drawings is shown in detail in FIG. 21. This circuit functions to generate the various reference voltages required by the gyroscope systems. In this circuit, accurate timing pulses having a frequency of $f_o$ are derived from a frequency standard (not shown), such as a crystal-controlled clock, for example, and are applied by a lead 201 to the inputs of the sequential logic sections of the circuit. The timing pulses are applied to a first frequency divider or scaler circuit 202 where they are changed to a lower frequency $f_a$ and applied to a filter 203 of suitable design. The output of filter 203 is applied through a 180° phase shifter 204 to an amplitude controller-buffer combination 205, 206 to produce the rotor voltage compensation electrode excitation voltage $E_C$. The output $f_a$ of the scaler 202 is also applied to a second frequency divider or scaler 207 where the frequency $f_a$ is converted to a lower frequency $f_b$ which is applied to a three phase logic circuit 208. The logic circuit 208 acts as a phase splitter to convert the $f_b$ signal to three signals having the same frequency but shifted in phase 120 degrees with respect to each other. The 0° output of the logic circuit 208 is applied through an active filter 209, a 180° phase shifter 210 and an amplitude controller 211 to produce the X axis bias voltage $V_{BX}$ which is at 0°. The output of the filter 209 is also applied through a 90° phase shifter 212 and an amplitude controller 213 to produce the $V_{BX}$ bias voltage which is at 90°. In a similar fashion, the 120° output of the logic circuit 208 is applied through a filter 214, phase shifters 215 and 216, and amplitude controllers 217 and 218 to produce the 0° and 90° components of the Y axis bias voltage $V_{BY}$. The Z axis bias voltage components $V_{BZ}$ at 0° and 90° are obtained from filter 219, phase shifters 220 and 221, and amplitude controllers 222 and 223. The input frequency $f_o$ is also applied to a third frequency scaler 224 to produce output frequency $f_c$ which is applied to the spin-up and rotor speed control circuit 200. All of the voltages produced by the excitation circuit are sinusoidal and regulated in amplitude.

Figure 22:
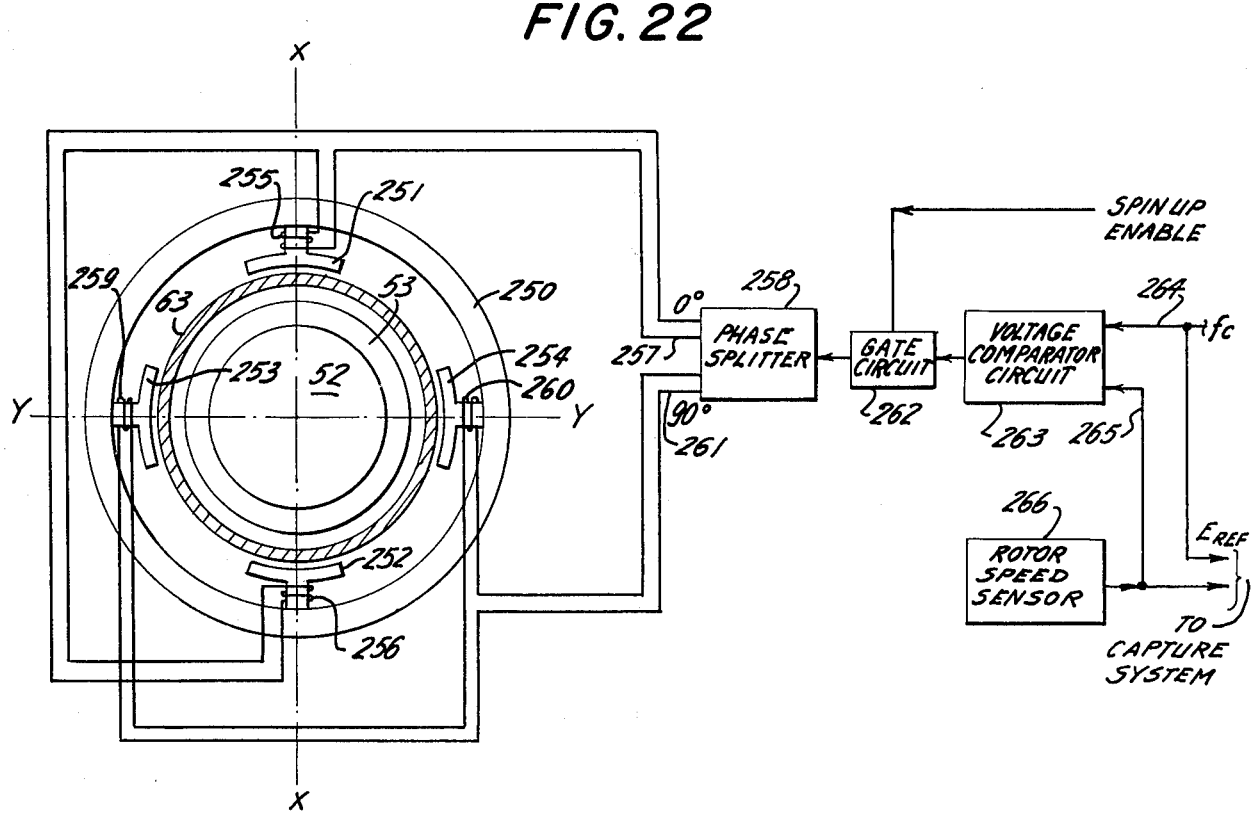
FIG. 22 is a schematic diagram of a rotor speed control circuit suitable for use with the gyroscope of the invention.

The spin-up and rotor speed control circuit 200 of FIG. 14 of the drawings is shown in detail in FIG. 22. As seen in FIG. 22 the gyroscope housing 63 is provided with a magnetic yoke structure 250 which surrounds the gyroscope housing in the X-Y plane. The yoke 250 is provided with a first pair of pole structures 251, 252 which are disposed along the X axis and a second pair of pole structures 253, 254 which are disposed along the Y axis of the gyroscope. The pole pieces 251 and 252 are provided with field windings 255 and 256 which are connected in series circuit across one output 257 of a phase splitter 258. In a similar fashion, the pole pieces 253 and 254 are provided with serially-connected field windings 259 and 260 which are connected across the other output 261 of the phase splitter 258. The phase splitter 258 functions to generate an A.C. signal of 0° phase at the output 257 and a similar signal of 90° phase at output 261, so that the magnetic field produced by the pole pieces 251, 252 and the magnetic field produced by the pole pieces 253, 254 are 90° out of phase with respect to each other. As is well known, this arrangement produces a rotating magnetic field in the X-Y plane of the gyroscope which will induce eddy currents in the equatorial flange 53 of the rotor 52. The induced eddy currents in the rotor flange produuce a torque which causes the rotor to rotate about the spin axis Z and build up speed. Although any one of a number of other arrangements for torquing the gyroscope rotor up to spin speed may be employed, the disclosed arrangement offers the advantage of being located completely outside of the evacuated gyroscope housing and does not interfere with rotor dynamics. Since the rotor 52 is disposed within a hard vacuum in the gyroscope case and is suspended by the novel electrostatic suspension system of the invention, the torque required to bring the rotor up to speed is extremely small and once the rotor is brought up to speed the speed of the rotor will very slowly from the selected speed. The rotor, in effect, continues to "coast" for a long period of time after the spin up torque is removed. This permits the spin torque for the rotor to be applied intermittently rather than continuously as in gyroscopes of the conventional type where a relatively large frictional loss is encountered during rotor operation.

The phase splitter 258 shown in FIG. 22 of the drawings has its input connected through a gate circuit 262 to the output of a voltage comparator circuit 263. The voltage comparator circuit has one input 264 coupled to the excitation circuit 137 to receive a voltage reference signal at the frequency $f_c$. The other input 265 of the voltage comparator circuit is coupled to receive the output of a rotor speed sensor 266. The rotor speed sensor 266 may comprise, for example, an optical pick-off system in which a beam of light is directed toward the rotor and is reflected from the rotor surface to a photodetector. The rotor is finished to provide good light reflectivity but is also provided with a bank or strip of poor light reflecting material, so that the light beam received by the photodetector is interruupted once interrupted each revolution of the rotor. The output of the photodetector will then consist of a series of pulses of variable length which may be sensed in a discriminator circuit and converted to a variable amplitude signal which is then applied to the input 265 of the voltage comparator circuit. Accordingly, the voltage comparator circuit will produce an output only when the rotor speed decays below the value corresponding to the fixed input 264 of the comparator circuit. By virtue of this arrangement, the rotor spin-up system need not be continuously energized. If desired, the rotor speed sensing circuit 266 may be designed to produce an output only at selected periods of time, so that the rotor speed is sensed only at predetermined time intervals. As illustrated in FIG. 22, the rotor speed sensor output signal and the fixed reference voltage are also applied to the electrostatic capture system for the gyroscope for reasons which will be explained hereinafter. The gate circuit 262 functions to prevent the application of a spin-up torque to the rotor until the rotor displacement is within the limits of physical capture by the suspension system and the equatorial flange 53 of the rotor is erected. Only when these two conditions are satisfied will the spin-up enable signal from the initialization circuit 151 actuate the gate circuit 262 to permit the rotor spin-up torque to be applied. The gate circuit 262 may conveniently comprise a junction field effect transistor having its gate electrode connected to receive the spin-up enable signal. It will be understood, of course, that other types of rotor speed sensors and rotor spin-up systems may be employed with the disclosed gyroscope.

The capture system for the gyroscope of the invention should be electrostatic in nature to be compatible with the gyroscope suspension system. Magnetic devices employed for the capture system could produce rotor loading and cause outgassing in the evacuated gyro housing. As explained previously, the capture support member 71 is mounted on the gyroscope housing by means of flexure hinge assembly 73 which permits the capture support member to be rotated about the two perpendicular support axes which are parallel to the precession axes, but prevents translatory movement along any of the three gyroscope axes. The vibrating beam force transducer assemblies 74 and 75 function to restrain rotation of the support member 71 about the two support axes of the member. The mechanism for decapturing the rotor employs four pairs of capture electrodes which are disposed in the X-Y plane defined by the precession axes of the gyroscope. Two pairs of capture electrodes are disposed along the X axis of the gyroscope on diametrically opposite sides of the rotor with one electrode of each pair disposed above the rotor flange 53 and the other electrode of each pair disposed beneath the rotor flange. All of the electrodes are mounted on the support member 71 and may be formed by electrodeposition of electrically conductive materials on an insulator, such as a ceramic, for example, which is bonded to the support member. By virtue of this arrangement, when the capture electrodes 57 are activated, they produce an electrostatic force on the rotor flange which in turn produces a pure torque on the rotor which will not load the electrostatic suspension system.

Figure 24:
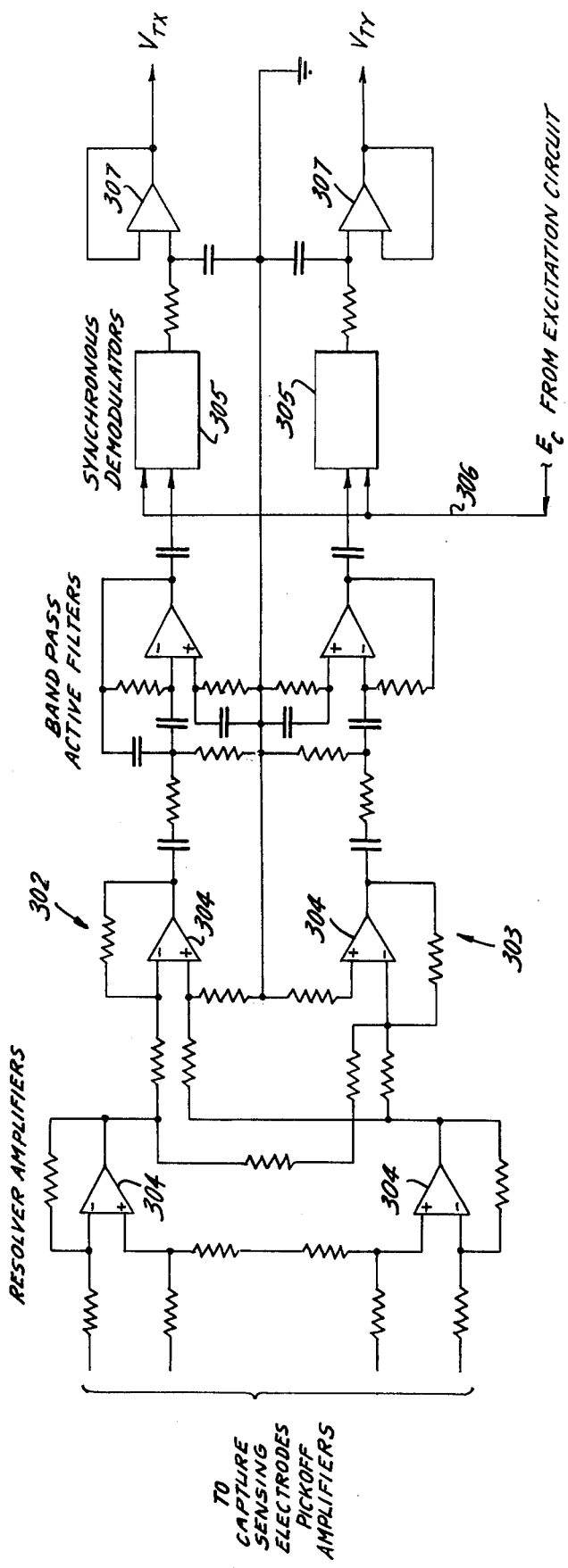
FIG. 24 is a detailed circuit diagram of the resolver demodulator circuits shown in FIG. 23 of the drawings.

A block diagram of the electrostatic capture system for the gyroscope of the invention is shown in FIG. 23 of the drawings wherein it is seen that the capture sensing electrode means consist of four capture sensing electrodes 300 which are disposed on the upper side of the rotor flange 53 in a plane parallel to the X-Y plane of the gyroscope. The capture sensing electrodes 300 are located on axes which bisect the X and Y axes, so that each of the four electrodes lies in a different one of the quadrants formed by the X-Y axes. The four sensing electrodes are mounted on the top cover portion 62 of the housing by techniques which are similar to the techniques employed for mounting the other electrodes of the gyroscope. Since the four capture sensing electrodes 300 are not disposed along the X and Y precession axes, their output signals must be resolved in order to produce components of the capture error signal along the X and Y axes. Each capture sensing electrode is coupled to a capacitive pickoff preamplifier 301 which may be mounted on the upper or pickoff half of the gyroscope housing. The pickoff amplifier 301 may comprise the same amplifiers as those described with reference to the electrostatic suspension system. The outputs of the two of the capacitive pickoff amplifiers are applied to a resolver demodulator circuit 302, while the remaining pickoff amplifiers are coupled to a resolver demodulator circuit 303. The resolver demodulators 302 and 303 are shown in detail in FIG. 24 of the drawings wherein it is seen that they function as a single circuit to process the outputs of the pickoff amplifiers 301 to produce a voltage analog of rotor tilt angle resolved along the X and Y axes. To this end, the four signals from the capture sensing electrodes 300 are processed by the difference and summing amplifiers 304 to yield the X axis and Y axis components of the capture error signal. These signals are then passed through the bandpass active filters illustrated in FIG. 24 and applied to synchronous demodulators 305 which may, for example, comprise four quadrant multipliers. The demodulators 305 are supplied with the reference signal $E_c$ which is generated by the excitation circuit 137 through a lead 306. The output signals from the demodulators 305 are passed through buffers 307 to yield the $V_{TX}$ and $V_{TY}$ components of the capture error signal which respectively represent the X axis and Y axis error.

Figure 25:
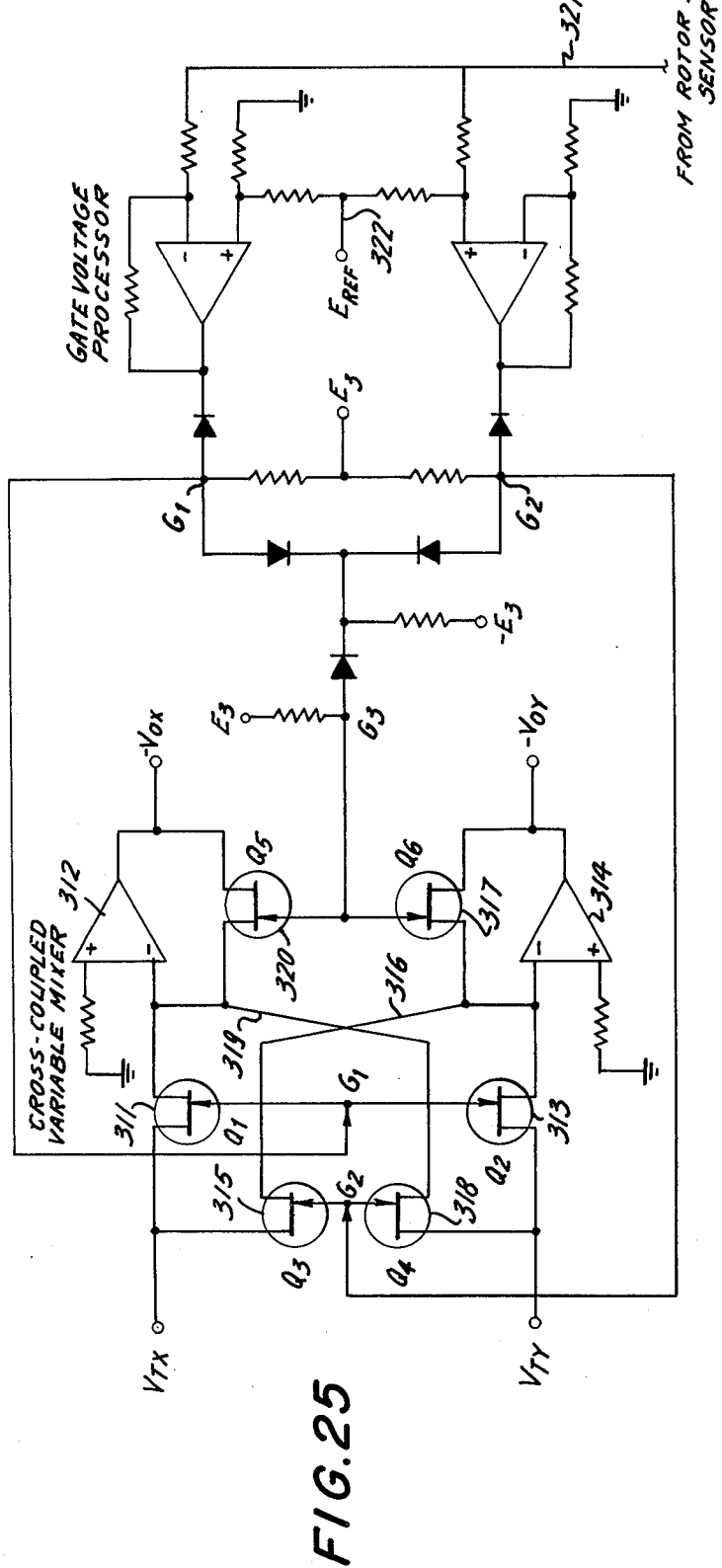
FIG. 25 is a detailed circuit diagram of the axis coupling circuit of FIG. 23 of the drawings.

As seen in FIG. 23 of the drawings, the $V_{TX}$ and $V_{TY}$ signals from the resolver demodulators are applied to the initialization circuit 151 where they are used to generate the spin-up enable signal. The resolver demodulator output signals are also applied to an axis coupling circuit 310 which is supplied with the rotor speed and reference voltage signals from the spin-up and speed control circuit 200. The axis coupling circuit 310 is shown in detail in FIG. 25 of the drawings wherein it is seen to comprise a cross-coupled variable mixer portion and a gate voltage processor portion. In the mixer portion of the circuit, the terminal which is connected to receive the $V_{TX}$ input signal is coupled through a junction field effect transistor 311 and a buffer inverter 312 to the output terminal where the X axis error component $-V_{OX}$ appears. In a similar fashion, the terminal which receives the $V_{TY}$ signal is coupled through a junction field effect transistor 313 and an inverter buffer 314 to the output terminal where the Y axis error component $-V_{OY}$ appears. The $V_{TX}$ input terminal is also coupled through a junction field effect transistor 315 and a lead 316 to the negative input terminal of the inverter buffer 314 and the inverter-buffer 314 is shunted by a junction field effect transistor 317. In a similar fashion, the $V_{TY}$ input terminal is coupled through a junction field effect transistor 318 and a lead 319 to the negative input of inverter-buffer 312 and this buffer is shunted by a junction field effect transistor 320. The gate voltage processor portion of the circuit is coupled to receive the output signal from the rotor speed sensor 266 in the spin-up and speed control circuit 200, while lead 322 couples this circuit to receive the reference voltage source from the speed control circuit as illustrated. The gate voltage processor portion of the circuit produces an output voltage at point $G_1$ which is coupled to the gate electrodes of the transistors 311 and 313 at point $G_1$, while the $G_2$ output of the processor portion of the circuit is coupled to the gate electrodes of transistors 315 and 318. The $G_3$ output of the processor portion of the circuit is coupled to the gate electrodes of shunt transistors 317 and 320.

Figure 26:
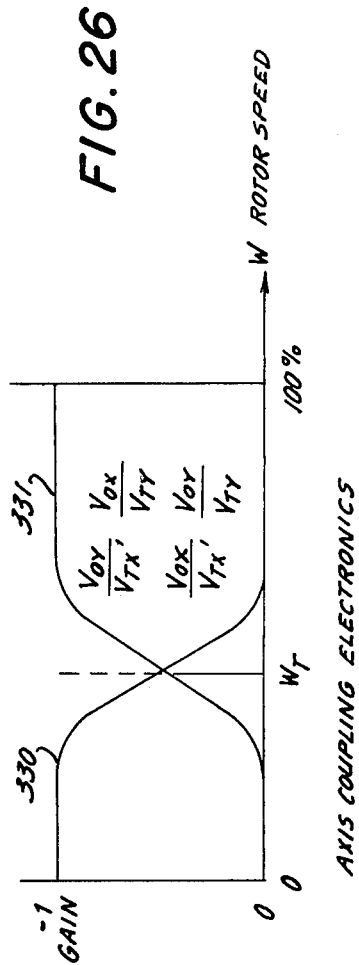
FIG. 26 is a graph showing X and Y axis signal gain through the axis coupling circuit plotted as a function of rotor speed.

The axis coupling circuit 310 operates to provide a mixing of the $V_{TX}$ and $V_{TY}$ signals as a function of rotor speed. When the rotor speeds are very low during start-up of the gyroscope, the capture system must function as two, direct-coupled force-rebalance positional servo systems. Since the gyroscope inertial terms exceed its gyroscope terms, the $V_{TX}$ component of the error signal should appear at the output of the axis coupling circuit as the $-V_{OX}$ signal and be applied to the capture electrodes 57 which are disposed on the X precession axis of the gyroscope. Similarly, at low rotor speeds, the $V_{TY}$ component of the capture error should appear at the output of the axis coupling circuit as the $-V_{OY}$ signal and be applied to the capture electrodes disposed on the Y axis. The function of the capture system at this time of low rotor speeds is merely to erect the gyroscope rotor so that the rotor flange 53 is disposed in the X-Y plane of the gyroscope. When the rotor reaches full operating speed, the capture system must function as two quadrature coupled servomechanisms to restrain the precessional forces acting on the rotor because of an input rate applied to the gyroscope. At this time, the $V_{TX}$ component of the capture error signal should appear at the output of the axis coupling circuit as the $-V_{OY}$ signal and be applied to the capture electrodes disposed on the Y axis. The $V_{TY}$ signal will then appear at the output of the coupling circuit as the $-V_{OX}$ output signal and be applied to the capture electrodes on the X axis. At full rotor speeds, the gyroscopic terms of the gyroscope far exceed the inertial terms, so that the quadrature rotor torquing action is required. Since lead 321 supplies a signal proportional to rotor speed, the voltage output at point $G_1$ is such as to cause the transistors 311 and 313 to be fully conducting at low rotor speeds, while the voltage output at $G_2$ is such as to shut off the transistors 315 and 318, so that the $V_{TX}$ input passes directly to the $-V_{OX}$ output terminal and the $V_{TY}$ input is applied directly to the $-V_{OY}$ output terminal. As the rotor speed increases, transistors 311 and 313 increase in resistance and transistors 315 and 318 decrease in resistance, so that a portion of the $V_{TX}$ input signal is applied to the input of inverter buffer 314 and a portion of the $V_{TY}$ input is applied to the inverter buffer 312. At this time, the $-V_{OX}$ and the $-V_{OY}$ output signals each contain a mixture of the $V_{TX}$ and $V_{TY}$ input signals. At full rotor speeds, transistors 311 and 313 are cut off and transistors 315 and 318 are fully conducting, so that full quadrature coupling exists. The transistors 317 and 320 which shunt the inverter-buffers are controlled by output $G_3$ of the voltage processor portion of the circuit in such manner that their drain-source resistances are equal to the least resistance of the remaining field effect transistors, so that the transfer gain of the predominant mode of the axis coupling circuit is maintained at unity. In FIG. 26 of the drawings, the direct transfer gain and the cross transfer gain of the axis coupling circuit are plotted as a function of rotor speed W. In this graphical representation, curve 330 represents the direct transfer gain and curve 331 represents the cross transfer gain.

Figure 27:
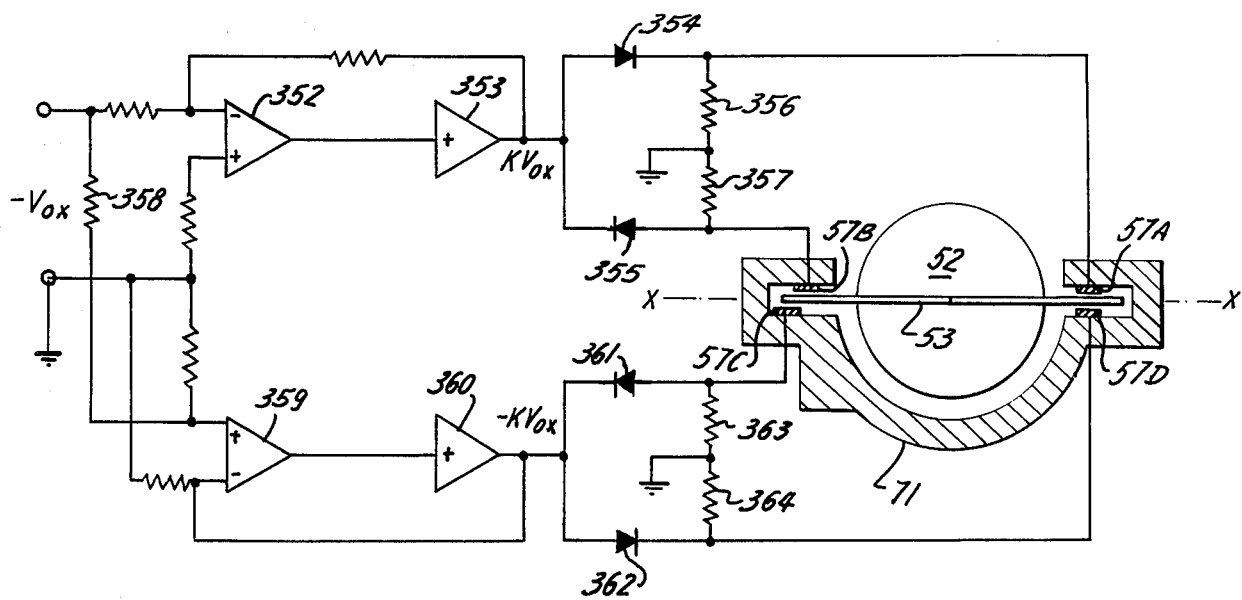
FIG. 27 is a circuit diagram of the X axis torque driver circuit of FIG. 23 of the drawings.

Referring again to FIG. 23 of the drawings, it is seen that the $-V_{OX}$ output of the axis coupling circuit 310 is applied to a torque driver 350 which produces both positive and negative going output signals which are applied to the X axis capture electrodes. The $-V_{OY}$ output signal of the axis coupling circuit is applied to a torque driver 351 which produces positive and negative going output signals which are applied to the Y axis capture electrodes. Since the torque driver circuits 350 and 351 are identical in construction and operation, the torque driver circuit 350 for the X gyroscope axis will be described in detail by reference to FIG. 27 of the drawings. As seen in FIG. 27, the $-V_{OX}$ input signal is applied to cascaded low voltage, inverter-amplifier stage 352 and high voltage, amplifier stage 353 to produce a phase-inverted output signal $KV_{OX}$ which is applied to a bridge circuit formed by rectifiers 354 and 355 and resistors 356 and 357. The output terminals of the bridge are connected to the capture electrodes 57A and 57B which are disposed on opposite sides of the rotor on the X axis on the upper side of the rotor flange 53. The $-V_{OX}$ input signal is also applied through a resistor 358 to cascaded low voltage amplifier stage 359 and high voltage amplifier stage 360 to produce an output signal $-KV_{OX}$ which is applied to a bridge circuit formed by rectifiers 361 and 362 and resistors 363 and 364. The output of this bridge circuit is applied to capture electrodes 57C and 57D which are disposed on opposite sides of the rotor along the X axis beneath the rotor rim.

The torque driver circuit 350 functions in a manner which insures that only one pair of diagonally-opposite capture electrodes are energized at a given time and that the pair of electrodes so energized have equal and opposite potentials to prevent a net potential from being induced on the gyroscope rotor by operation of the capture system. The capture electrodes produce a rotor torque which is a pure moment, so that no translatory force is exerted on the rotor by operation of the capture system. For example, when a negative-going signal $-V_{OX}$ is applied to the torque driver illustrated, it is inverted in sign and amplified by amplifiers 352 and 353 to produce a positive-going signal $KV_{OX}$ which is applied to the bridge circuit for the upper capture electrodes. Since the signal is positive going, rectifier 354 will conduct and energize capture electrode 57A with a positive potential, but capture electrode 57B will not be energized because of the blocking direction of rectifier 355. The same signal is amplified by amplifiers 359 and 360 and appears as a negative-going signal $-KV_{OX}$ which is applied to the bridge circuit for the lower capture electrodes. Rectifier 361 will conduct and permit energization of capture electrode 57C with a negative potential, while rectifier 362 will block and prevent energization of capture electrode 57D. Accordingly, only electrodes 57A and 57C are energized and the signals applied to these electrodes are equal in magnitude but opposite in polarity. In a similar fashion, for positive-going input signals $V_{OX}$, the circuit illustrated will energize capture electrodes 57B and 57D with signals of the same magnitude but opposite polarity. In this manner, the input signals to the torque driver circuit 350 will produce rotor torques about the Y precession axis in a direction which depends upon the polarity of the input signals.

Figure 28:
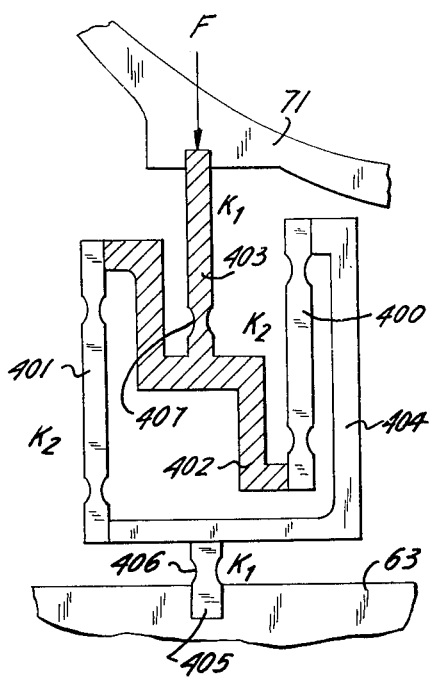
FIG. 28 is a schematic diagram of one of the vibrating beam force transducers of the gyroscope of the invention.

A schematic diagram of one of the vibrating beam force transducers 74 and 75 is shown in FIG. 28 of the drawings wherein the transducer is shown as being connected between the capture support member 71 and the gyroscope housing 63. As mentioned previously, one transducer is located on the X gyroscope axis and the other transducer is located on the Y gyroscope axis, to thereby provide two axis rate outputs for the gyroscope. Each vibrating beam force transducer consists of a first resonator beam 400 and a second resonator beam 401 which are substantially parallel to each other. The top of beam 401 is connected to the bottom of beam 400 by a beam support member 402 which has a column 403 formed thereon which is so connected to the capture support member 71 that a rotational movement of the capture support member in either direction about the axis being sensed by that force transducer produces a force F. The upper end of beam 400 is also mechanically connected to the lower end of beam 401 by means of an L-shaped yoke or beam support member 404. The support member 404 is connected by a column 405 to the gyroscope housing 63.

Figure 30:
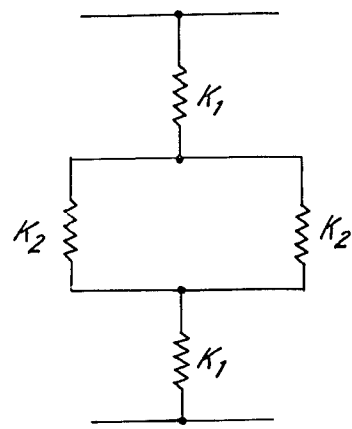
FIG. 30 is a diagram of the equivalent spring system for the vibrating beam force transducer shown in FIG. 29 of the drawings.
Figure 29:
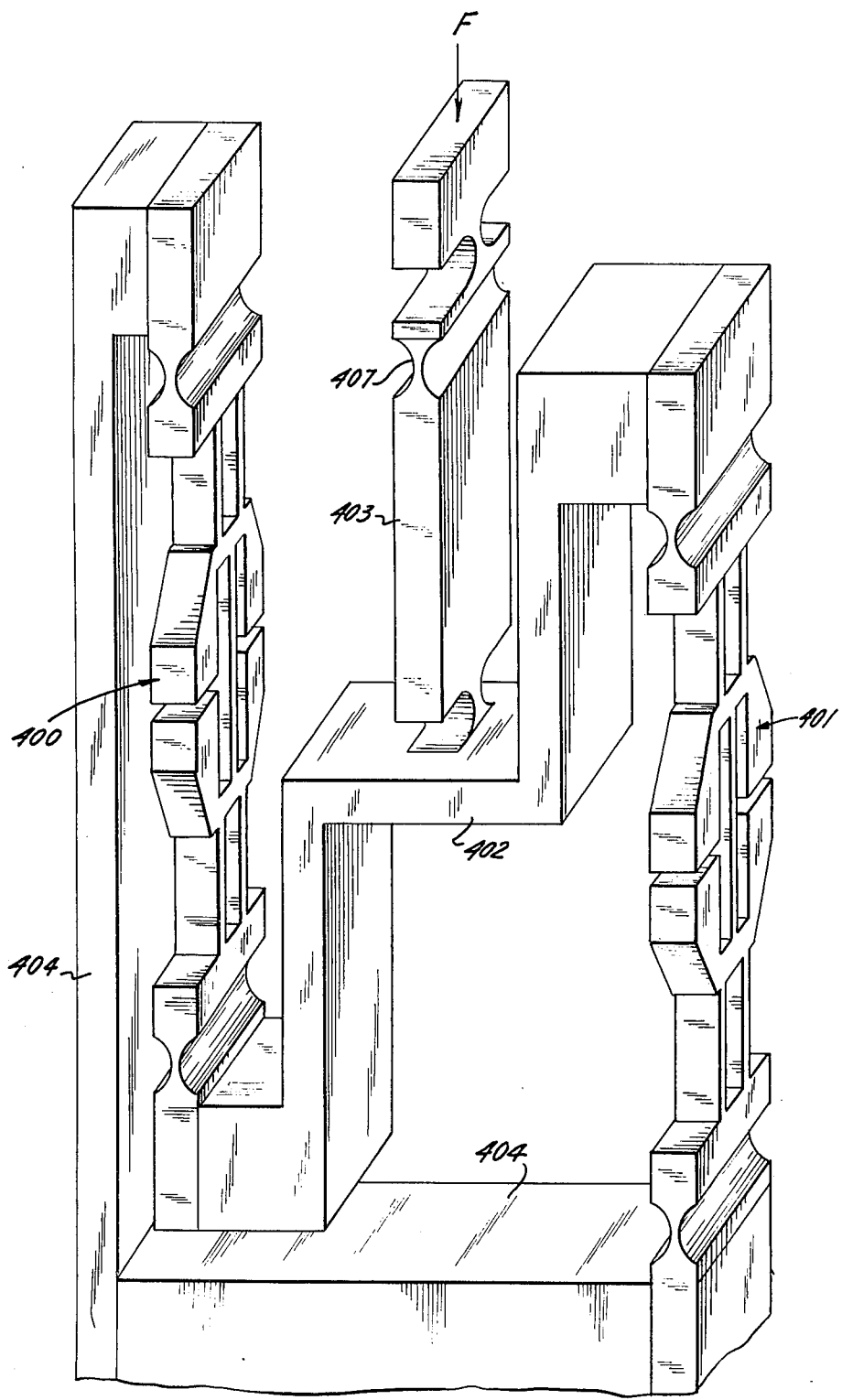
FIG. 29 is a perspective view of the vibrating beam force transducer showing details of construction.

The detailed construction of the vibrating beam force transducer assembly is shown in FIG. 29 of the drawings. As seen in FIG. 28 and 29, when the force F which is exerted on the vertical column 403 by the capture system support member 71 is in a downward direction, resonator beam 400 is placed in tension and resonator beam 401 is placed in compression. When the force F is exerted in the opposite direction, beam 400 is placed in compression and beam 401 is placed in tension. Each of the resonator beams 400 and 401 is in effect a force transducer which produces an electrical output signal having a frequency which is a function of the stress in that beam and consequently is a function of the load applied to the transducer. By connecting the resonator beams 400 and 401, so that one beam is in tension and the other beam is in compression for a given force, the resonator beams are used in a push-pull mode which causes the individual scale factors of the beams to add and the biases to subtract. This arrangement serves to double the resolving capabilities of the force transducer and to substantially reduce its bias. In order to eliminate the effect of thermal expansion, two flexure joints 406 and 407 have been incorporated in each force transducer. If these flexure joints were not present, a false output signal could be produced by the force transducer because of differential thermal expansion. The flexure joints, which are in effect sections of reduced cross-sectional area, allow the push-pull vibrating beam structure to rotate under thermal expansion and thereby relieve any preload on the resonator beams 400 and 401. When the transducer is thermally stabilized during operation, the effect of any thermally-induced rotation will remain constant for the given operating temperature and would be absorbed in the overall instrument scale factor. The operation of the push-pull mechanical arrangement may be illustrated schematically in FIG. 30 of the drawings as a series-parallel combination of springs, wherein $K_1$ represents the vertical columns 403 and 405 and $K_2$ represents the resonator beams 400 and 401.

Figure 31:
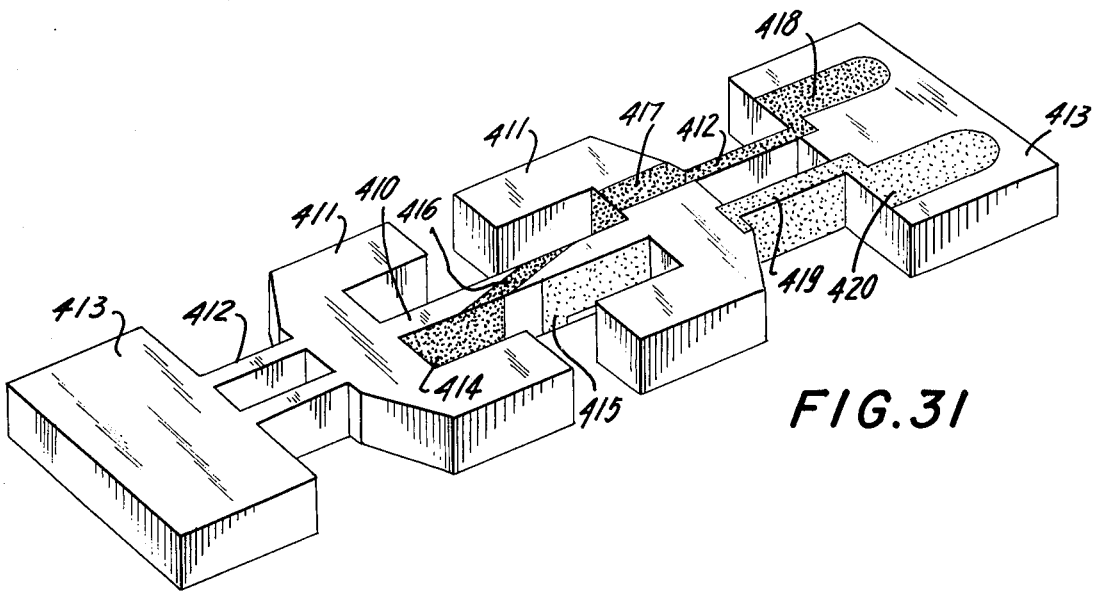
FIG. 31 is a perspective view of one of the resonator beams employed in the force transducer assembly showing the conductor and electrode configuration thereon.

The details of construction of the resonator beams 400 and 401 are shown in FIG. 31 of the drawings wherein it is seen that each beam consists of a vibrating beam portion 410, two spring mass portions 411, two longitudinal axis isolation sections 412 and two mounting ends 413. The vibrating beam portion 410 consists of a single crystal of alpha-quartz which is a Y-cut crystal. The sections 411 of the resonator beam provide the proper spring mass, while the isolation sections 412 function to minimize energy leakage through the motion of the vibrating beam by impeding its transmission to the mounting surfaces 413. This arrangement reduces the energy dissipated into the structure and materially increases the resonance Q of the beam. The larger the resonator Q can be made, the more insensitive its frequency becomes to changes in the oscillator which energize the beam. A typical mechanical Q of the resonator assembly would be 30,000.

Figure 32:
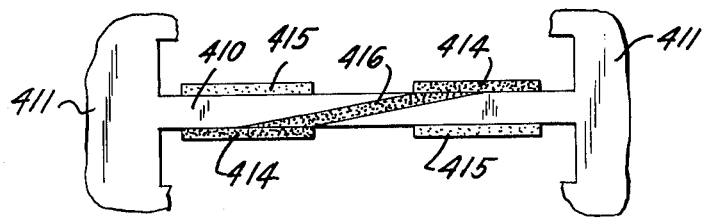
FIG. 32 is a top plan view of a portion of the resonator beam showing the electrode pattern thereon.

In order to generate a transverse vibration when energized by piezoelectric means, the resonator section 410 of the beam is plated with positive and negative electrodes as shown in FIGS. 31 and 32 of the drawings wherein the positive electrode is designated as 414 and the negative electrode is designated as 415. The positive and negative electrodes are placed on both sides of the resonator section 410 as shown in FIG. 32 of the drawings. The positive electrodes 414 are connected together by a conductive strip 416 which extends over the top of the resonator section 410, while the negative electrodes 415 are connected together by a similar strip (not shown) extending across the bottom of the resonator section. The positive electrode 414 is connected by an electrically-conductive strip 417 which is located on the spring mass portion 411 and the isolation portion 412 to a terminal 418 on the mounting surface 413. In a similar fashion, the negative electrode 415 is connected by a conductive strip 419 to a negative terminal 420 on the mounting surface 413. When the terminals 418 and 420 are connected to a suitable oscillator, the resonator section 410 is caused to oscillate at its resonant frequency. When the beam is placed in tension or compression by the application of a longitudinal force, the frequency of oscillation is caused to change in proportion to the magnitude of the force applied. The direction of frequency change above or below the natural resonant frequency of the resonator section indicates whether the beam is placed in compression or tension and therefore indicates the direction of the force applied. The operating characteristics and details of construction of vibrating beam force transducers of this type are discussed in U.S. Pat. No. 3,465,597, issued Sept. 9, 1969 and U.S. Pat. No. 3,470,400, issued Sept. 30, 1969 and will not be described further herein.

Figure 33:
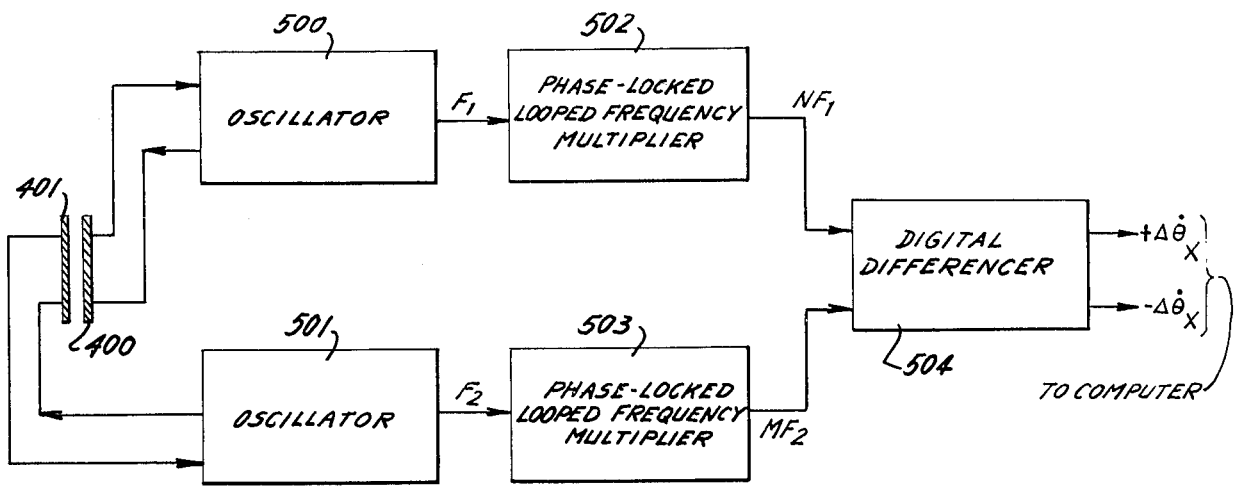
FIG. 33 is a block diagram of the vibrating beam force tranducer signal processing circuit.

Each of the resonator beams 400 and 401 is made to resonate at a different natural frequency, so that there is no cross coupling between the beams which could produce a spurious output. As mentioned previously, the mechanical push-pull arrangement which is utilized places one beam in tension and the other beam in compression in response to a given input force to thereby reduce bias and thermal errors in the force transducer output. The output signal of the transducer appears as a difference frequency between the frequencies of the two resonator beams 400 and 401. A circuit for processing the output signal from one of the force transducers is shown in FIG. 33 of the drawings. Although the signal processing circuit shown in FIG. 33 is for the X axis transducer, the same circuit may be employed for the Y axis force transducer. As seen in FIG. 33, the vibrating beam 400 is connected to an oscillator 500 which causes that beam to oscillate at its natural resonant frequency, while the beam 401 is connected to an oscillator 501 which causes that beam to oscillate at its natural resonant frequency. The output frequency $F_1$ of the oscillator 500 is applied to a phase-locked, looped frequency multiplier 502 which converts the sinusoidal oscillator output into a digital pulse train having a pulse repetition rate of $NF_1$. The output of oscillator 501 which is at frequency $F_2$ is applied to a similar phase-locked, looped frequency multiplier 503 which produces a digital output pulse train having a pulse repetition rate of $MF_2$. The outputs of the frequency multipliers 502 and 503 are applied to a digital differencer 504 which produces an output pulse rate equal to the difference between the input rates $NF_1$ and $MF_2$ in accordance with known techniques. The output signals from the digital differencer 504 which may be applied to a computer, for example, are of the following form:

$$(3) + \Delta \dot{\theta}_x = N\dot{F}_1 - M\dot{F}_2, \text{ and}$$

$$(4) - \Delta \dot{\theta}_x = 0,$$

where $NF_1$ is greater than $MF_2$; and (5) $+ \Delta \dot{\theta}_x = 0$, and
(6) $- \Delta \dot{\theta}_x = M\dot{F}_2 - N\dot{F}_1$, where $NF_1$ is less than $MF_2$.

The oscillator circuits 500 and 501 function to provide the active gain and amplitude control circuitry necessary to cause the resonators to oscillate at their respective natural resonant frequencies and may conveniently comprise a bridge type oscillator where the resonator comprises an arm of the bridge. As mentioned previously, the oscillator 500 and 501 are set to oscillate at different resonant frequencies. For example the oscillator 500 and resonator beam 400 associated therewith may be set for a resonant frequency of 30KHz, while the oscillator 501 and resonator beam 401 associated therewith may be set to oscillate at 40KHz. By employing two different natural resonant frequencies for the resonators 400 and 401, it is not possible for the vibration of one beam to be crossed coupled to the other beam. The phase-locked, looped frequency multipliers 502 and 503 function to multiply the resonant frequencies $F_1$ and $F_2$ which are produced by the oscillators by different multiples, so that the natural resonant frequency of each signal from the pair of resonator beams 400 and 401 which reaches the digital differencer has the same resonant frequency. For example, if the oscillator 500 is set for 30KHz, the multiplier 502 may be set to multiply this frequency by a factor of four, thereby giving an output frequency of $NF_1$ equal to 120KHz. The multiplier 503 may then be set to multiply the 40KHz signal from oscillator 501 by a factor of three, so that the output signal $MF_2$ would also be equal to 120KHz. By virtue of this arrangement, the digital differencer 504 receives signals of the same basic frequency.

Figure 34:
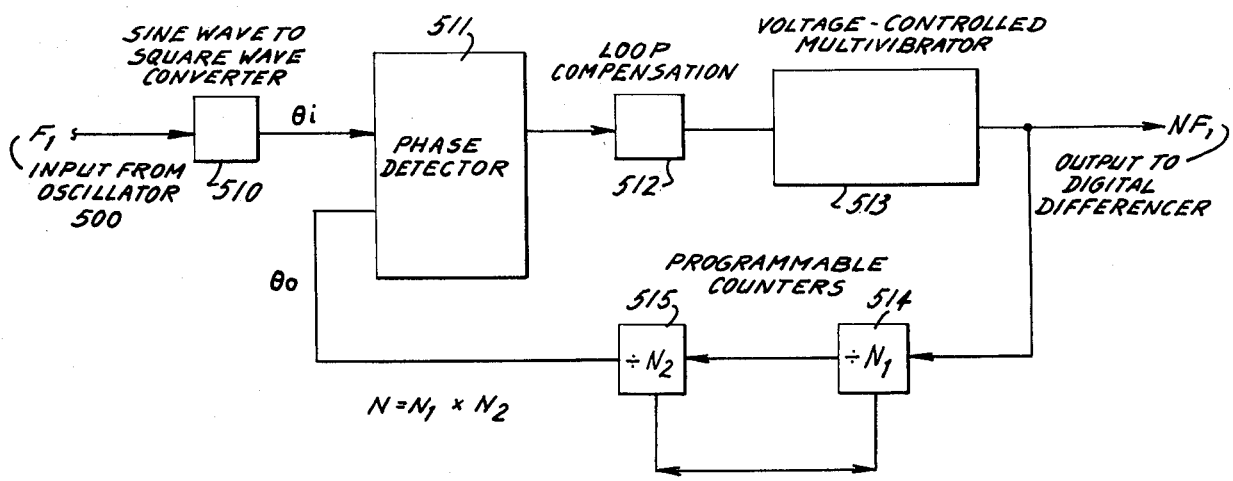
FIG. 34 is a block diagram of one of the phase locked, looped frequency multipliers shown in FIG. 33 of the drawings.

A suitable phase-locked, looped frequency multiplier circuit is shown in FIG. 34 of the drawings wherein it is seen that the output from oscillator 500 is coupled to a sine wave to square wave converter 510 which converts the sinusoidal oscillator output to a pulse train having low and high levels compatible with digital circuitry. The output of the converter 510 is coupled to one input of a phase detector 511 which functions as a phase difference-to-voltage converter. The output of the phase detector 511 is coupled throgh a loop compensation circuit 512 to the input of a voltage-controlled multivibrator 513. The loop compensation circuit 512 functions in a known manner to provide a zero steady-state phase error between the two input signals to the phase detector 511. The voltage-controlled multivibrator 513 functions to convert the input voltage to a pulse train output which is suitable for application to the digital differencer 504. The output of the voltage-controlled multivibrator is coupled through cascaded programmable counters 514 and 515 to produce a square wave output for the other input of the phase detector 511. By virtue of this arrangement, the output pulses from the frequency multiplier circuit 502 have a pulse repetition rate which is N times the rate of the input signals $F_1$ applied to the circuit. The multiplication factor N is controlled by the setting of the programmable counters 514 and 515. The same circuit may be employed for the frequency multiplier 503 which is utilized to multiply the output of oscillator 501, with the exception that that multiplier circuit would be programmed to multiply by a factor of M. Since the pulse trains $NF_1$ and $MF_2$ which are applied to the digital differencer 504 have the same repetition rate when the resonator beams 400 and 401 are in an unstressed condition, the digital differencer circuit will sense the shift in frequency of the output signals from the beams 400 and 401 which is caused by the application of the force F to the transducer and will sense the frequency difference between the signals to thereby provide digital output signals of suitable form which represent the input rate to the gyroscope.

It is believed apparent that many changes could be made in the construction and described uses of the foregoing electrostatic rate gyroscope and many seemingly different embodiments of the invention could be constructed without departing from the scope thereof. For example, different electrode configurations could be employed and a different placement of the suspension electrodes utilized to provide proper rotor levitation. Additionally, the electrostatic suspension and capture techniques employed could be used in single axis gyroscopes, directional gyroscopes or other inertial devices. Accordingly, it is intended that all matter contained in the above description or shown in the accompanying drawings shall be interpreted as illustrative and not in a limiting sense.

What is claimed is:

1. A gyroscope having at least one input axis comprising: a housing having a cavity therein; a rotor disposed within said cavity; electrostatic suspension means for suspending said rotor within said cavity to permit rotor rotation about a spin-axis and at least one precession axis; means to impart a rotation to said rotor and to maintain said rotation at a predetermined rate; electrostatic capture means for exerting a torque on said rotor to prevent rotor rotation about said at least one precession axis in response to an input rate applied to the input axis of the gyroscope; and force transducer means coupled to said capture means for producing an output signal in response to the torque exerted by said capture means, whereby said output signal is responsive to said applied input rate.

2. A gyroscope as claimed in claim 1 wherein said rotor is formed of electrically conductive material; and said electrostatic suspension means comprises
displacement sensing electrode means for sensing the position of said rotor within said cavity, and
sspension electrode means responsive to the output of said displacement sensing electrode means for exerting an electrostatic force on said rotor.

3. A gyroscope as claimed in claim 2 wherein
said rotor and said cavity are substantially spherical in shape; and
said suspension electrode means comprises three pairs of suspension electrodes mounted on the housing surface defining said cavity, said three pairs of suspension electrodes being disposed on three orthogonal axes with the electrodes of each pair on diametrically opposite sides of said rotor.

4. A gyroscope as claimed in claim 3 wherein
said displacement sensing electrode means comprises four pairs of displacement sensing electrodes mounted on the housing surface defining said cavity, each pair of said sensing electrodes being disposed on an axis which is equidistant from the axes on which the suspension electrodes are disposed, so that each sensing electrode is disposed in a different one of the octants defined by the suspension electrode axes; and said electrostatic suspension means further comprises resolver circuit means coupled to the outputs of said displacement sensing electrodes for resolving said outputs into rotor displacement components along said suspension electrode axes.

5. A gyroscope as claimed in claim 4 wherein a rotor voltage compensation electrode is mounted on the housing surface defining said cavity in the space between said suspension electrodes and said displacement sensing electrodes; and rotor voltage compensation circuit means are coupled between said resolver circuit means and said rotor voltage compensation electrode for producing a rotor voltage compensation signal which is equal in magnitude and opposite in phase to the residual rotor voltage induced on said rotor by said suspension electrodes, so that said rotor is maintained at substantially zero potential.

6. A gyroscope as claimed in claim 4 wherein each of said suspension electrodes comprises two separate electrode sections; and the input voltages applied to said electrode sections are opposite in phase, so that the residual rotor voltages induced on said rotor by the sections of each suspension electrode cancel each other out and said rotor is maintained at substantially zero potential.

7. A gyroscope as claimed in claim 5 wherein the input voltages applied to the three pairs of suspension electrodes are 120° out of phase with respect to each other.

8. A gyroscope as claimed in claim 7 wherein a sinusoidal displacement sensing electrode excitation voltage is applied to said rotor voltage compensation electrode for exciting said displacement sensing electrodes, so that the output signals from said displacement sensing electrodes are amplitude modulated signals representing rotor displacement; and said electrostatic suspension means further comprises demodulator means coupled to the output of said resolver circuit means for demodulating said amplitude modulated signals to produce rotor displacement signals.

9. A gyroscope as claimed in claim 1 wherein said rotor and said cavity are substantially spherical in shape;

said rotor is provided with an equatorial flange of electrically conductive material disposed in a plane defined by said input and precession axes; and said electrostatic capture means exerts an electrostatic force on said equatorial rotor flange.

10. A gyroscope as claimed in claim 9 wherein said electrostatic capture means comprises capture sensing electrode means for sensing rotor rotation about said precession axis, a capture support member mounted on said housing for limited movement about an axis parallel to said gyroscope input axis and having a rim portion adjacent said rotor flange, and capture electrode means mounted on said capture support member rim portion and responsive to the output of said capture sensing electrode means for exerting a torque on said rotor about the gyroscope input axis in a direction to prevent rotor rotation about said precession axis; and said force transducer means comprises an electromechanical force transducer connected between said capture support member and said housing and responsive to the reaction torque exerted on said capture member by said capture electrode means about said support member movement axis.

11. A gyroscope as claimed in claim 10 wherein said electromechanical force transducer is a vibrating beam force transducer of the type having at least one resonator beam which produces an electrical output signal which is a function of the mechanical stress produced in said resonator beam by the force being sensed.

12. A gyroscope as claimed in claim 11 wherein said capture electrode means comprises two pairs of capture electrodes disposed on said capture support member rim portion on diametrically opposite sides of said rotor on said gyroscope input axis with the electrodes of each pair disposed on opposite sides of said rotor flange; and said electrostatic capture means further comprises electrode driver circuit means for energizing only one electrode of each pair of capture electrodes at a time with the electrodes so energized being on opposite sides of said rotor flange and being energized with equal and opposite potentials, so that no net potential is induced on said rotor by the capture means.

13. A gyroscope as claimed in claim 11 wherein said vibrating beam force transducer comprises first and second parallel-spaced resonator beams, a first resonator beam support member connected to the top of said first resonator beam and the bottom of said second resonator beam, and a second resonator beam support member connected to the bottom of said first resonator beam and the top of said second resonator beam, so that one of said resonator beams will be placed in tension and the other of said beams placed in compression when a force is exerted between said beam support members.

14. A gyroscope as claimed in claim 13 wherein each of said first and second resonator beam support members has a section of reduced cross-sectional area which acts as a flexure joint to allow the vibrating beam force transducer to rotate under thermal expansion and thereby prevent prestressing of the resonator beams.

15. A gyroscope as claimed in claim 14 wherein each of said first and second resonator beams comprises piezoelectric crystal means having a frequency which is a function of applied axial force.

16. A gyroscope as claimed in claim 15 wherein the piezoelectric crystal means of said first and second resonator beams have different unstressed resonant frequencies to prevent mechanical coupling between the beams;

the output signals from each of said crystal means are applied to different frequency multiplier means with the multiplication factor of each of said multiplier means being so selected that the frequencies of the outputs from the multiplier means are the same when said resonator beams are unstressed; and digital differencer circuit means coupled to the outputs of said frequency multiplier means for producing an output pulse rate equal to the difference between the output pulse rates from said multiplier means.

17. A gyroscope having two input axes comprising
a housing having a substantially spherical cavity therein;
a substantially spherical rotor disposed within said cavity, said rotor having an equatorial flange of electrically conductive material disposed in a plane defined by said input axes;
electrostatic suspension means for suspending said rotor within said cavity to permit rotor rotation about a spin axis and two precession axes where said precession axes are coincident with said input axes;
electrostatic capture means for exerting torques on said rotor to prevent rotor rotation about said precession axes in response to input rates applied to the input axes of the gyroscope, said capture means comprising
capture sensing electrode means for sensing rotor rotation about each of said precession axes,
a capture support member mounted on said housing for at least limited rotation about two perpendicular axes which are parallel to said gyroscope input axes, said support member having a rim portion surrounding said rotor and disposed adjacent said rotor flange,
first capture electrode means mounted on said capture support member rim portion along one of said precession axes for exerting electrostatic force on said rotor flange to produce a rotor torque about the other of said precession axes,
second capture electrode means mounted on said capture support member rim portion along said other precession axis for exerting electrostatic force on said rotor flange to produce a rotor torque about said one precession axis, and
coupling circuit means for coupling the output of said capture sensing electrode means to said first and second capture electrode means; and
vibrating beam force transducer means connected between said capture support member and said housing for sensing the reaction torque exerted on said capture member by each of said capture electrode means about said support member movement axes, said transducer means being of the type having at least one resonator beam which produces an electrical output signal which is a function of the mechanical stress produces in the resonator beam by the force being sensed.

18. A gyroscope as claimed in claim 17 wherein
said capture sensing electrode means comprises four capture sensing electrodes mounted on said housing adjacent said rotor flange iin the quadrants defined by said first and second capture electrode means; and
said coupling circuit means comprises resolver circuit means for resolving rotor rotation into components of rotor rotation about each of said precession axes.

19. A gyroscope as claimed in claim 18 further comprising
means for sensing the speed of rotation of said rotor about said spin axis; and
axis coupling circuit means coupled between said resolver circuit means and said first and second capture electrode means and responsive to the output of said rotor speed sensing means for making said first capture electrode means responsive to rotor rotation about said other precession axis at low rotor speeds and responsive to rotor rotation about said one precession axis at high rotor speeds and for making said second capture electrode means responsive to rotor rotation about said one precession axis at low rotor speeds and responsive to rotor rotation about said other precession axis for high rotor speeds,
so that said capture means acts as a direct coupled positional servomechanism at low rotor speeds to erect said rotor and a quadrature coupled servomechanism at high rotor speeds to capture said rotor.

20. A gyroscope as claimed in claim 17 wherein said vibrating beam force transducer means comprises
a first vibrating beam force transducer for restraining rotation of said capture support member about one of the axes or rotation thereof; and
a second vibrating beam force transducer for restraining rotation of said capture support member about the other of the axes of rotation thereof.

* * * * *